United States Patent [19]
Togino

[11] Patent Number: 5,936,773
[45] Date of Patent: Aug. 10, 1999

[54] IMAGE-FORMING OPTICAL APPARATUS HAVING A DECENTERED OPTICAL SURFACE

[75] Inventor: Takayoshi Togino, Koganei, Japan

[73] Assignee: Olympus Optical Co., Ltd., Tokyo, Japan

[21] Appl. No.: 09/069,982

[22] Filed: Apr. 30, 1998

[30] Foreign Application Priority Data

Jul. 2, 1997 [JP] Japan ................................... 9-176860

[51] Int. Cl.$^6$ .................................................. G02B 27/14
[52] U.S. Cl. .......................... 359/630; 359/637; 359/631
[58] Field of Search ................................... 359/630, 631, 359/633, 637

[56] References Cited

U.S. PATENT DOCUMENTS

| | | | |
|---|---|---|---|
| 3,810,221 | 5/1974 | Plummer | 396/382 |
| 3,838,931 | 10/1974 | Valla | 404/69 |
| 4,763,990 | 8/1988 | Wood | 359/630 |
| 5,035,474 | 7/1991 | Moss et al. | 359/630 |
| 5,661,603 | 8/1997 | Hanano et al. | 359/622 |
| 5,701,202 | 12/1997 | Takahashi | 359/631 |

FOREIGN PATENT DOCUMENTS

| | | |
|---|---|---|
| 6-235886 | 8/1994 | Japan . |
| 7-325258 | 12/1995 | Japan . |
| 7-325269 | 12/1995 | Japan . |

*Primary Examiner*—Georgia Epps
*Assistant Examiner*—Ricky Mack
*Attorney, Agent, or Firm*—Pillsbury Madison & Sutro LLP

[57] ABSTRACT

A compact image-forming optical apparatus which is free from moire fringes and capable of providing an aberration-free, clear image of minimal distortion even at a wide field angle. The image-forming optical apparatus has an objective optical system (104) and an electronic image pickup device (108). The objective optical system (104) has at least one reflecting surface (106, 107) decentered such that the whole surface is tilted with respect to the axial principal ray. The reflecting surface has a rotationally asymmetric surface configuration that corrects rotationally asymmetric decentration aberrations caused by decentration. A low-pass member (103) is disposed in the vicinity of a pupil plane (101) closer to the object than the reflecting surface. The low-pass member cuts off a high-frequency component concerning the object image in a bundle of rays led to the electronic image pickup device (108).

17 Claims, 26 Drawing Sheets

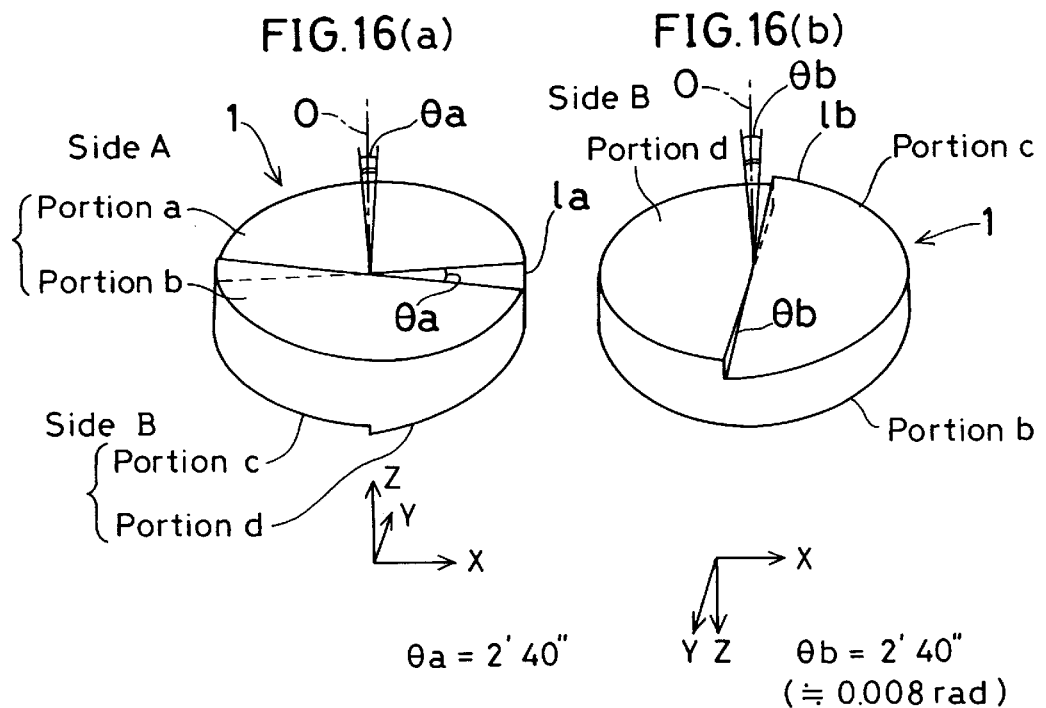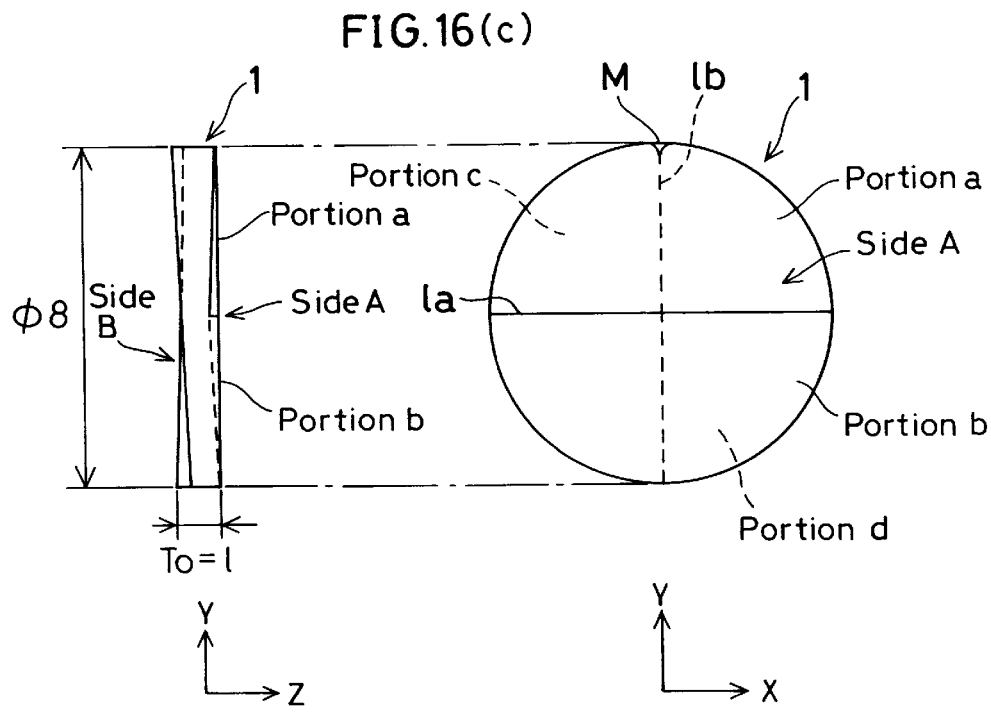

$\theta = 2'$
($\fallingdotseq 0.00029$ rad)

FIG. 20(a)
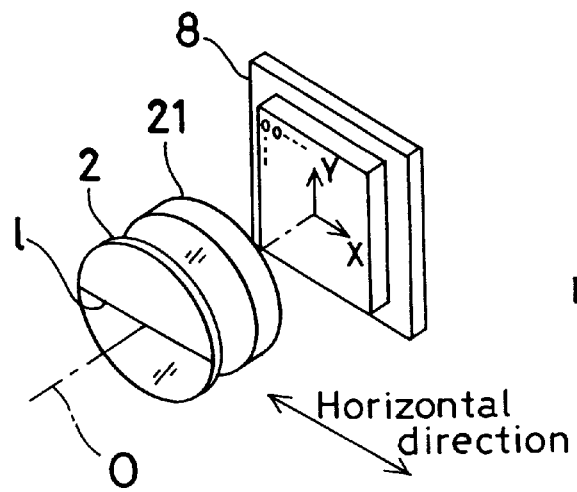
FIG. 20(b)
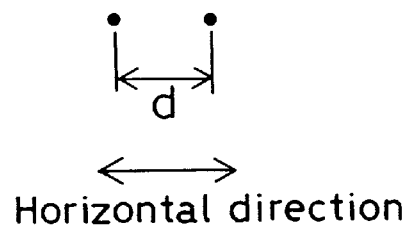
FIG. 21
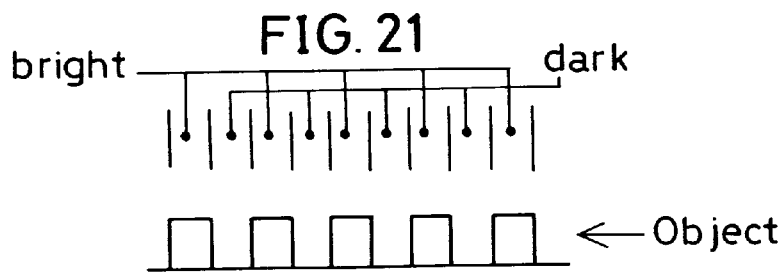
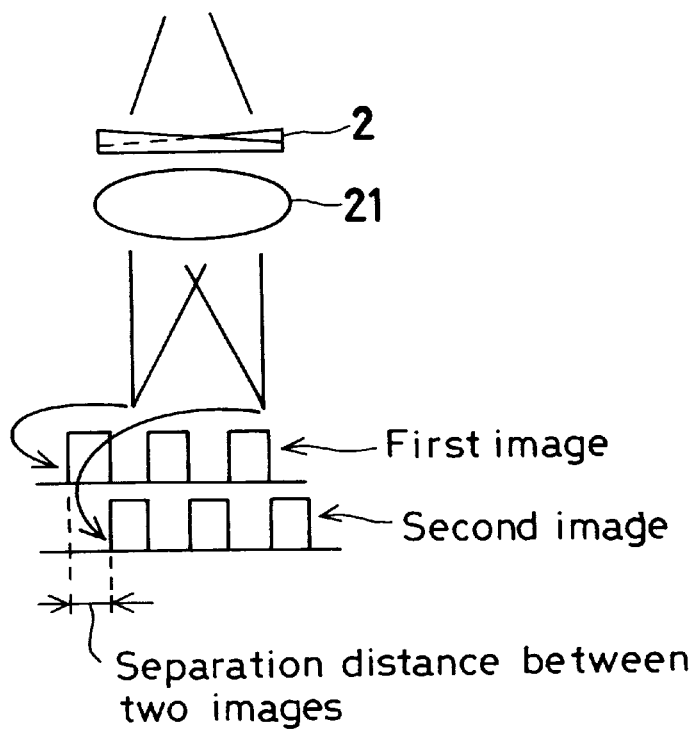

FIG. 24
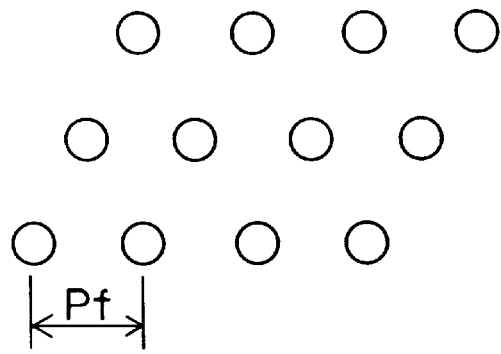
FIG. 25(a)      FIG. 25(b)
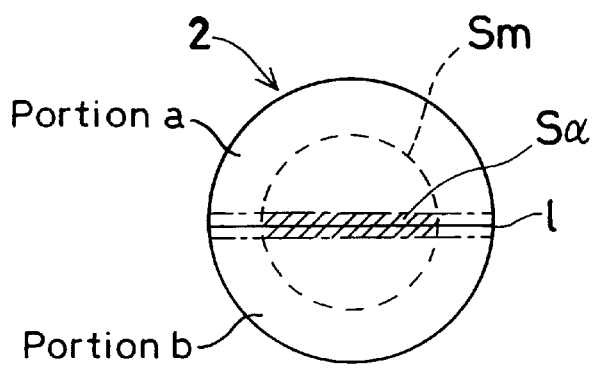 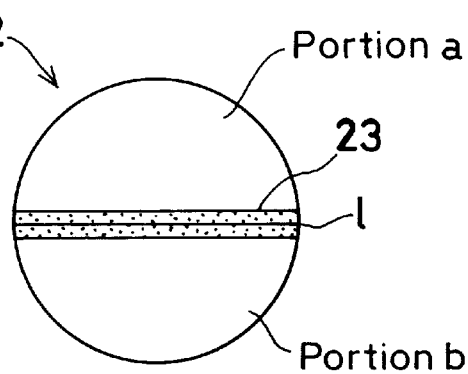
FIG. 26(a)
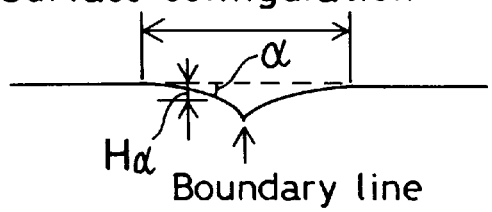
FIG. 26(c)
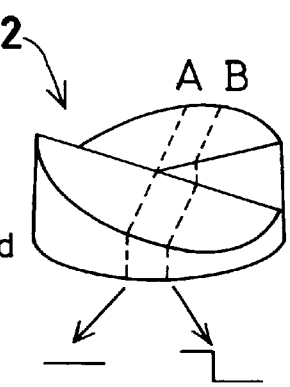
FIG. 26(b)
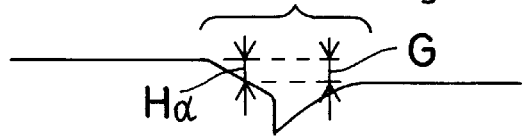

FIG. 32
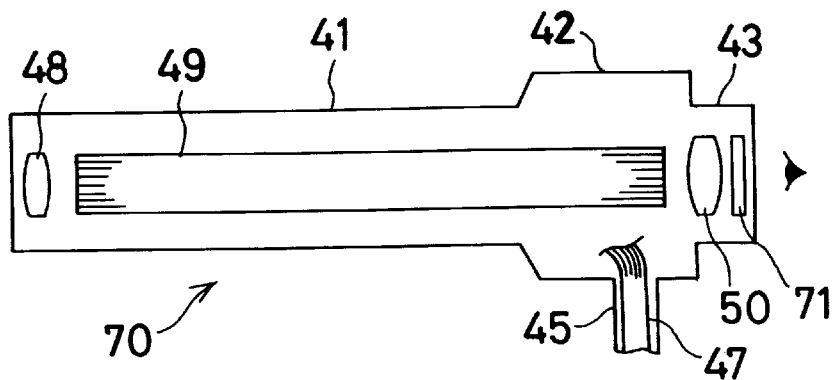
FIG. 33(a)    FIG. 33(b)
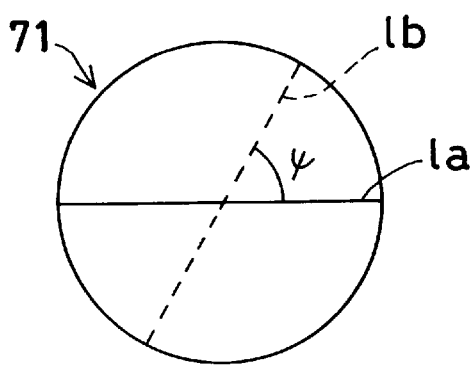    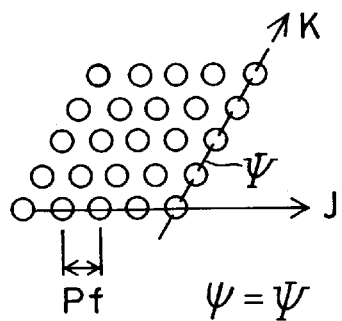
$\psi = \Psi$
FIG. 34
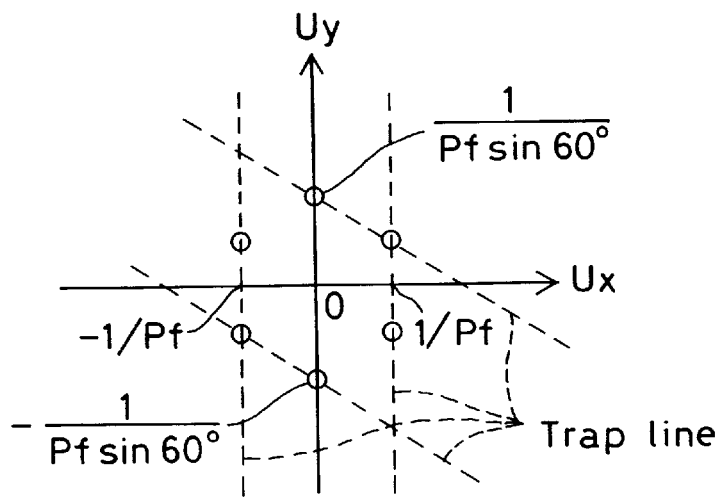

FIG. 35(a)  FIG. 35(b)
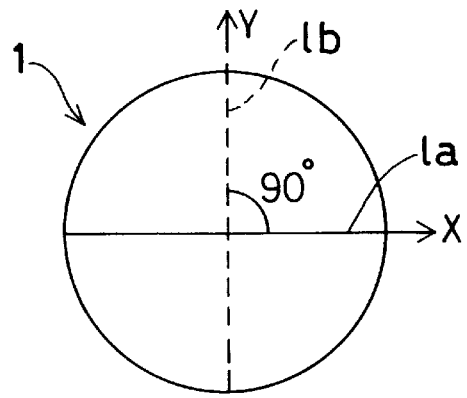
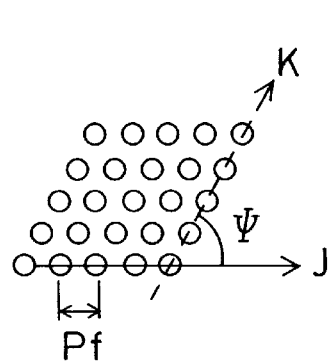
FIG. 36
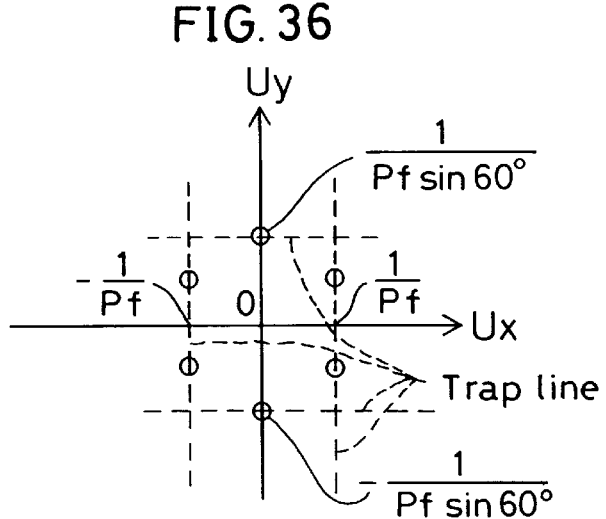
FIG. 37(a)  FIG. 37(b)
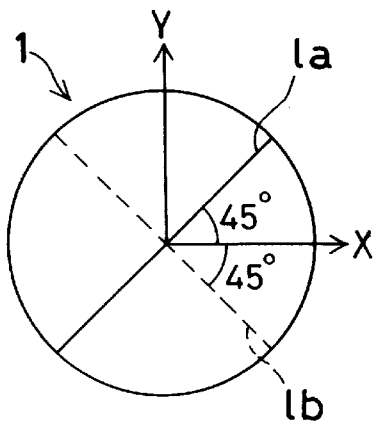
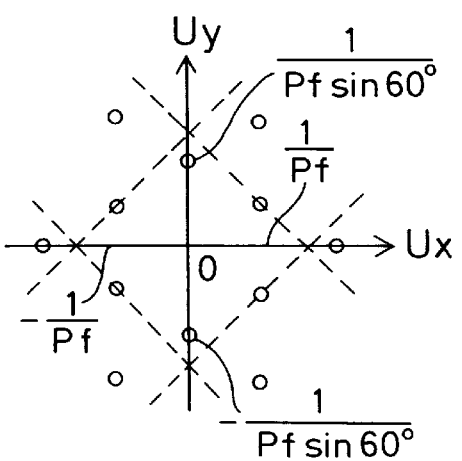

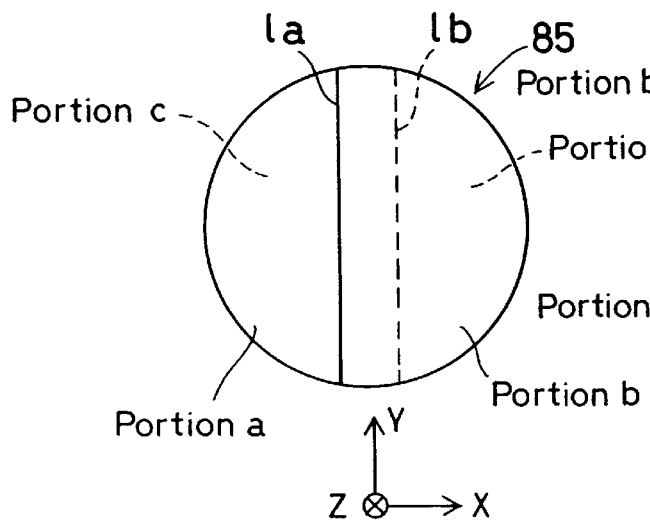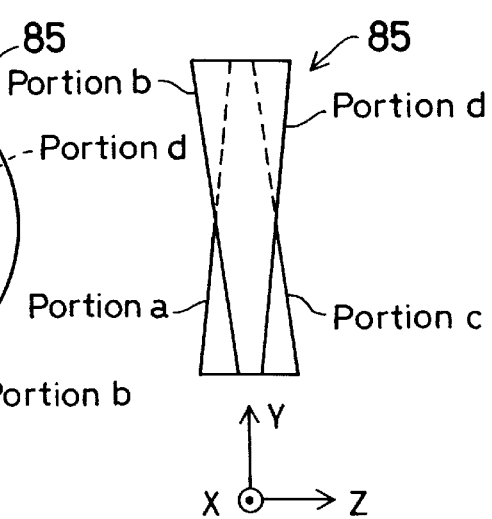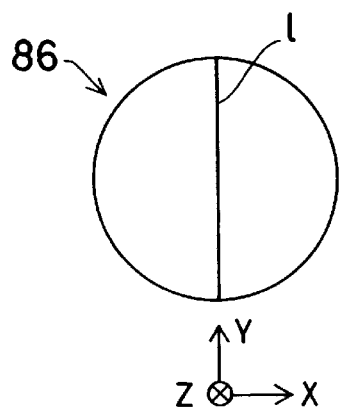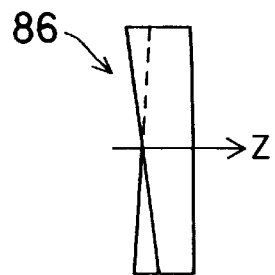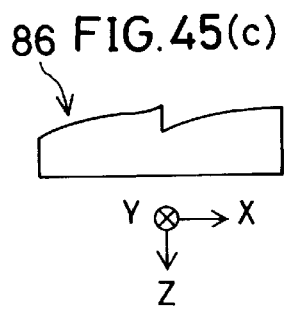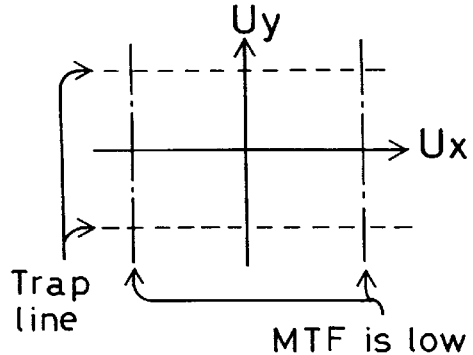

FIG. 46(a) FIG. 46(b) FIG. 46(c)
FIG. 47
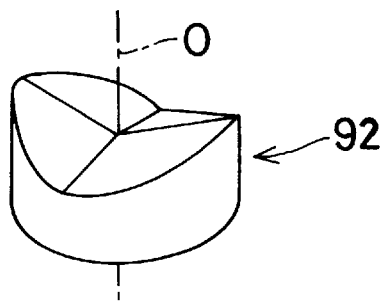
FIG. 48(a)   FIG. 48(b)
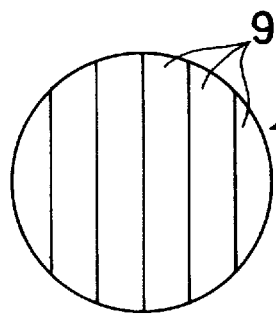 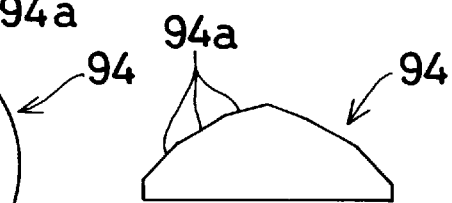
FIG. 49
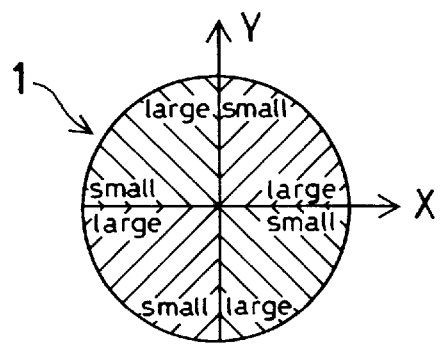

IMAGE-FORMING OPTICAL APPARATUS HAVING A DECENTERED OPTICAL SURFACE

BACKGROUND OF THE INVENTION

The present invention relates to an image-forming optical apparatus and, more particularly, to an image-forming optical apparatus which is most suitable for an image pickup apparatus designed to form an image relatively small in size and uses an objective optical system in which at least one reflecting surface having an image-forming power required for image formation is decentered.

There has heretofore been known a compact reflecting decentered optical system as disclosed in Japanese Patent Application Unexamined Publication Number [hereinafter referred to as "JP(A)"] 59-84201. This is an invention of a one-dimensional light-receiving lens comprising a cylindrical reflecting surface; therefore, two-dimensional imaging cannot be effected with this conventional optical system. JP(A) 62-144127 discloses an optical system wherein the identical cylindrical surface is used twice to effect reflection in order to reduce spherical aberration in the above-mentioned invention.

JP(A) 62-205547 discloses the use of an aspherical reflecting surface as a reflecting surface, but makes no mention of the configuration of the reflecting surface.

U.S. Pat. Nos. 3,810,221 and 3,836,931 both disclose an example in which a rotationally symmetric aspherical mirror and a lens system having a surface which has only one plane of symmetry are used to constitute a finder optical system of a reflex camera. In this example, however, the surface having only one plane of symmetry is utilized for the purpose of correcting the tilt of a virtual image for observation.

JP(A) 1-257834 (U.S. Pat. No. 5,274,406) discloses an example in which a surface having only one plane of symmetry is used for a reflecting mirror to correct image distortion in a rear projection type television. In this example, however, a projection lens system is used for projection onto a screen, and the surface having only one plane of symmetry is used for correction of image distortion. An example of a back-coated mirror type decentered optical system using an anamorphic surface and a toric surface as an observation optical system is also disclosed. However, the decentered optical system is not sufficiently corrected for aberrations, including image distortion.

None of the above-described prior arts use a surface having only one plane of symmetry as a back-coated mirror to form a folded optical path.

JP(A) 8-292368, 8-292371 and 8-292372 each disclose an image pickup optical system (i.e. a fixed focal length optical system or a zoom optical system) using a surface having only one plane of symmetry as a reflecting surface. However, the disclosed image pickup optical system has an unfavorably long optical path length from an entrance surface of an optical system constituent element including a rotationally asymmetric surface to an exit surface thereof or from a rotationally asymmetric surface of the optical system that is closest to the object to a rotationally asymmetric surface thereof that is closest to the image (in an example, image formation takes place once in the course of travel of light along the optical path). This causes the optical system to increase in size. Therefore, there is no merit in using rotationally asymmetric surfaces, which are difficult to produce.

Incidentally, to remove moire fringes appearing in an image pickup apparatus due to superposition of the repeating period of the pixels of an image pickup device and a spatial frequency component in an object image which is close to the repeating period, JP(A) 7-325269 proposes a low-pass filter which enables such moire patterns to be effectively removed by using a double image formed by pupil division and which is less costly and effective even under defocus conditions.

In the conventional rotationally symmetric optical systems, a transmitting rotationally symmetric lens having a refracting power is assigned to exert the required refracting power. Therefore, many constituent elements are needed for aberration correction. In the conventional decentered optical systems, an imaged figure or the like is undesirably distorted and the correct shape cannot be recorded unless the formed image is favorably corrected for aberrations, particularly rotationally asymmetric distortion.

In a rotationally symmetric optical system comprising a refracting lens which is formed from a surface rotationally symmetric about an optical axis, a straight-line optical path is formed. Therefore, the entire optical system undesirably lengthens in the direction of the optical axis, resulting in an unfavorably large-sized image pickup apparatus.

SUMMARY OF THE INVENTION

In view of the problems associated with the prior arts, an object of the present invention is to provide a compact image-forming optical apparatus which is capable of providing a clear image of minimal distortion even at a wide field angle and which has a low-pass filter to remove moire fringes appearing when an image is taken by using an electronic image pickup device, e.g. a CCD.

To attain the above-described object, the present invention provides an image-forming optical apparatus having an objective optical system and an electronic image pickup device which is disposed in a plane where an image of an object is formed by the objective optical system. The objective optical system has at least one reflecting surface decentered such that the whole surface is tilted with respect to an axial principal ray defined by a light ray emanating from the center of the object and passing through the center of the pupil to reach the center of the object image. The reflecting surface has a rotationally asymmetric surface configuration that corrects rotationally asymmetric decentration aberrations caused by decentration. A low-pass member is disposed in the vicinity of a pupil plane closer to the object than the reflecting surface. The low-pass member cuts off a high-frequency component concerning the object image in a bundle of light rays led to the electronic image pickup device.

In this case, it is desirable for the objective optical system to have a prism member formed from a medium having a refractive index (n) larger than 1 (n>1). The prism member desirably has at least three optical surfaces which include a first surface disposed closest to the object and having an action through which a bundle of light rays enters the prism member, a third surface which is a reflecting surface having the above-described rotationally asymmetric surface configuration to reflect the ray bundle entering the prism member, and a second surface having an action through which the ray bundle exits from the prism member.

In this case, the prism member is desirably formed such that a bundle of light rays from the object enters the prism member through the first surface, and the incident light rays are first reflected by the second surface and then reflected by the third surface so as to exit from the prism member through the second surface.

According to the present invention, the objective optical system has at least one reflecting surface decentered such that the whole surface is tilted with respect to the axial principal ray. The reflecting surface has a rotationally asymmetric surface configuration that corrects rotationally asymmetric decentration aberrations caused by decentration. Further, a low-pass member adapted to cut off a high-frequency component concerning the object image in a bundle of light rays led to the electronic image pickup device is disposed in the vicinity of a pupil plane closer to the object than the reflecting surface. Therefore, it is possible to obtain a compact image-forming optical apparatus which is free from moire fringes and capable of providing an aberration-free, clear image of minimal distortion even at a wide field angle.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 16A–16C are diagrams showing a double-sided polyhedral lens used in a first embodiment of a prior application.

FIGS. 20A and 20B are perspective views showing an image pickup optical system of a television camera.

FIG. 21 is a diagram for explaining the basic idea of removing moire fringes by a double image formed by using a single-sided polyhedral lens.

FIG. 24 is a diagram showing an image of an array of fibers in a fiber bundle.

FIGS. 25A and 25B are diagrams showing a disordered portion in the vicinity of a boundary of a polyhedral lens.

FIG. 26A–26C are diagrams showing the disordered portion in FIG. 25 by using an enlarged view and so forth.

FIG. 32 is a diagram showing the structure of a fiberscope according to a third embodiment of the prior application.

FIGS. 33A and 33B are diagrams showing the directions of boundary lines on a double-sided polyhedral lens and also showing an array of fibers in a fiber bundle.

FIG. 34 is a diagram showing an operation of removing dark due to clad portions according to the third embodiment of the prior application by using a spatial frequency plane.

FIGS. 35A and 35B are diagrams showing the directions of boundary lines on a double-sided polyhedral lens in a first modification of the third embodiment of the prior application and also showing an array of fibers in a fiber bundle.

FIG. 36 is a diagram showing an operation of removing dark due to clad portions according to the first modification of the third embodiment of the prior application by using a spatial frequency plane.

FIGS. 37A and 37B are diagrams showing the directions of boundary lines on a double-sided polyhedral lens according to a second modification of the third embodiment of the prior application and also showing an operation of removing dark due to clad portions by using a spatial frequency plane.

FIGS. 44A and 44B are diagrams showing a double-sided polyhedral lens in a seventh embodiment of the prior application.

FIGS. 45A and 45D are diagrams showing a single-sided polyhedral lens in an eighth embodiment of the prior application.

FIGS. 46A–46C are diagrams showing a single-sided polyhedral lens in a modification of the eighth embodiment of the prior application.

FIG. 47 is a diagram showing a single-sided polyhedral lens in a ninth embodiment of the prior application.

FIGS. 48A and 48B are diagrams showing a single-sided polyhedral lens in a modification of the ninth embodiment of the prior application.

FIG. 49 is a diagram showing an optical path length in a double-sided polyhedral lens.

DESCRIPTION OF THE PREFERRED EMBODIMENTS

First, the objective optical system according to the present invention will be described below.

Figure 1:
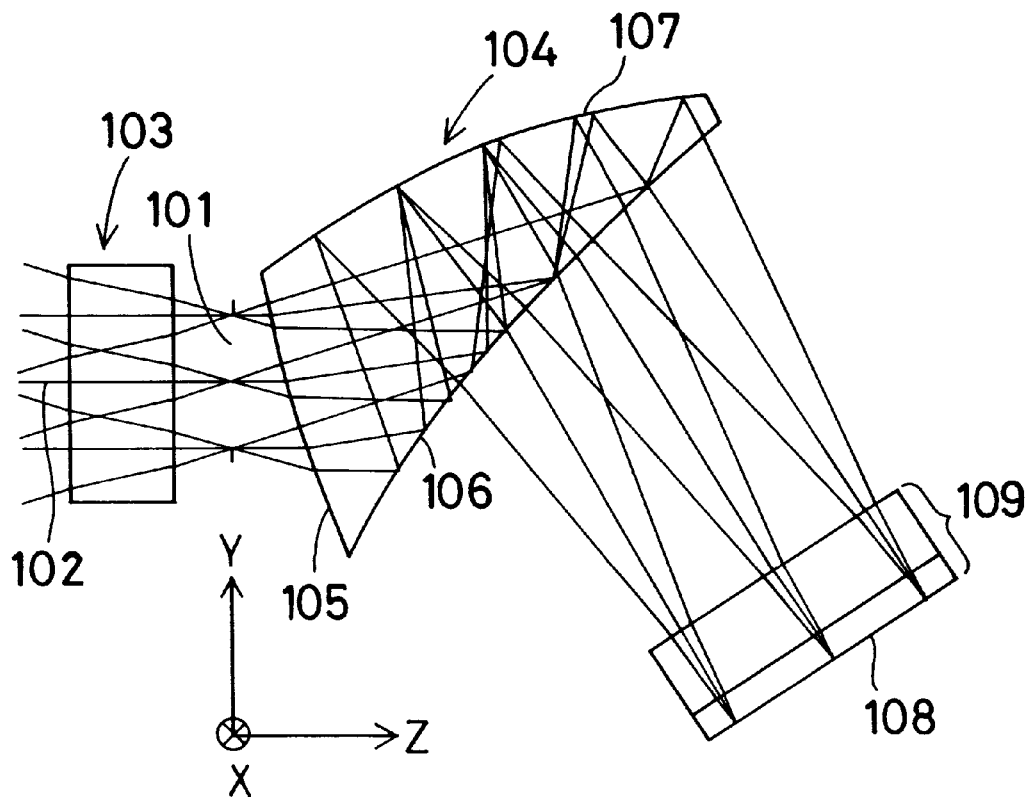
FIG. 1 is a sectional view of an image-forming optical apparatus according to Example 1 of the present invention.

Let us explain a coordinate system used in the following description. As shown in FIG. 1, it is assumed that a light ray passing through the center of an object point and passing through the center of a stop 101 to reach the center of an image plane 108 is defined as an axial principal ray 102. It is also assumed that an optical axis defined by a straight line along which the axial principal ray 102 travels until it intersects a first surface 105 of a decentered prism optical system 104 constituting the objective optical system according to the present invention is defined as a Z-axis, and that an axis perpendicularly intersecting the Z-axis in the decentration plane of each surface constituting the decentered prism optical system 104 is defined as a Y-axis, and further that an axis perpendicularly intersecting the Z-axis and also perpendicularly intersecting the Y-axis is defined as an X-axis.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to favorably effect aberration correction with a minimal number of surfaces. The reason for this is to reduce various aberrations which would be produced by spherical surfaces. However, in a decentered optical system, rotationally asymmetric aberrations due to decentration cannot be corrected by a rotationally symmetric optical system.

Figure 50:
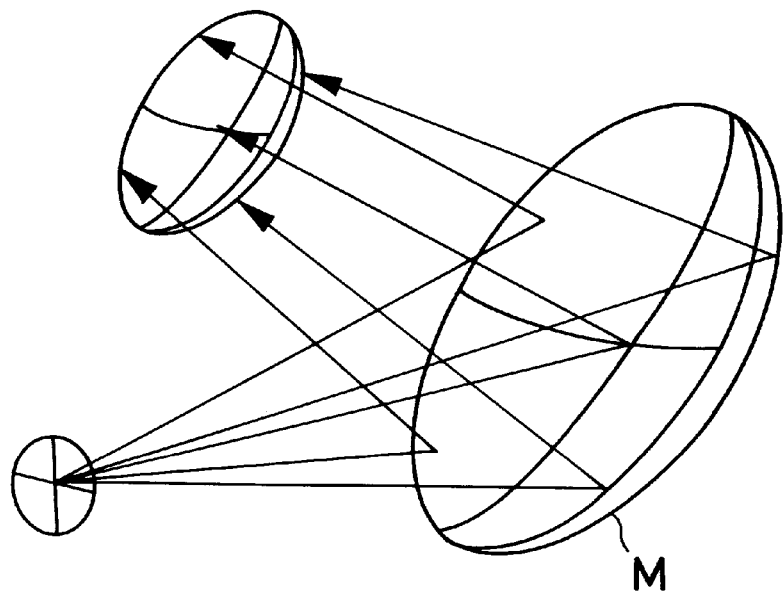
FIG. 50 is a conceptual view for explaining curvature of field produced by a decentered concave mirror.
Figure 51:
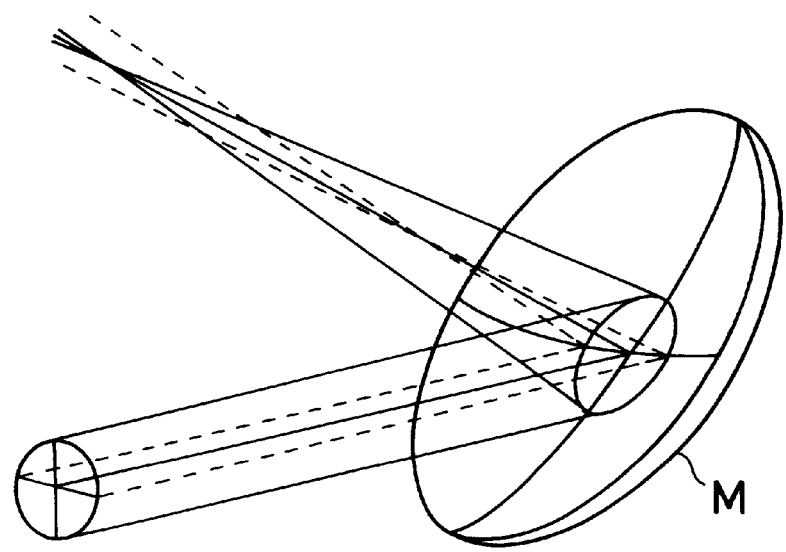
FIG. 51 is a conceptual view for explaining astigmatism produced by a decentered concave mirror.
Figure 52:
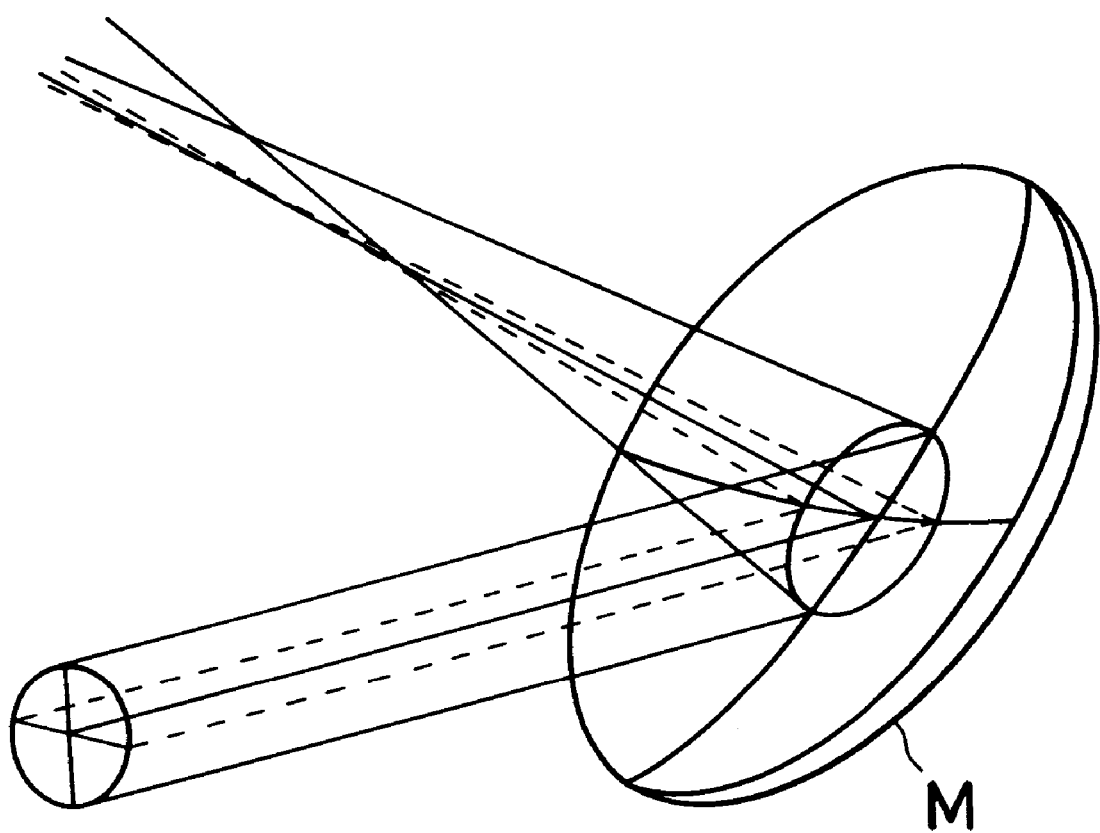
FIG. 52 is a conceptual view for explaining coma produced by a decentered concave mirror.

When a rotationally symmetric optical system is decentered, rotationally asymmetric aberrations occur, and it is impossible to correct these aberrations only by a rotationally symmetric optical system. Rotationally asymmetric aberrations due to decentration include image distortion, curvature of field, and astigmatic and comatic aberrations, which occur even on the axis. FIG. 50 shows curvature of field produced by a decentered concave mirror M. FIG. 51 shows astigmatism produced by a decentered concave mirror M. FIG. 52 shows axial comatic aberration produced by a decentered concave mirror M. In the objective optical system accordingly to the present invention, a rotationally asymmetric surface is disposed in the optical system to correct such rotationally asymmetric aberrations caused by decentration.

Rotationally asymmetric aberrations produced by a decentered concave mirror include rotationally asymmetric curvature of field. For example, when light rays from an infinitely distant object point are incident on a decentered concave mirror, the light rays are reflected by the concave mirror to form an image. In this case, the back focal length from that portion of the concave mirror on which the light rays strike to the image surface is a half the curvature of the portion on which the light rays strike. Consequently, an image surface tilted with respect to the axial principal ray is formed as shown in FIG. 50. It has heretofore been impossible to correct such rotationally asymmetric curvature of field by a rotationally symmetric optical system. The tilted curvature of field can be corrected by forming the concave mirror M from a rotationally asymmetric surface, and, in this example, arranging it such that the curvature is made strong (refracting power is increased) in the positive Y-axis direction (the upward direction in the figure), whereas the curvature is made weak (refracting power is reduced) in the negative Y-axis direction (the downward direction in the figure). It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 51, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 52, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

If the objective optical system according to the present invention is arranged to have a folded optical path, it is possible to impart a power to a reflecting surface and hence possible to omit a transmission lens. Moreover, because the optical path is folded, the optical system can be formed in a compact structure.

If the reflecting surface is a totally reflecting surface tilted with respect to light rays so that the light rays are incident thereon at an angle exceeding the critical angle, a high reflectivity can be obtained, and it is possible to enable the surface to have both reflecting and transmitting actions. The reflecting surface is preferably a reflecting surface having a thin film of a metal, e.g. aluminum or silver, formed thereon, or a reflecting surface formed from a dielectric multilayer film, or a semitransparent reflecting surface. In the case of a metal thin film having reflecting action, a high reflectivity can be readily obtained. The use of a dielectric reflecting film is advantageous in a case where a reflecting film having wavelength selectivity or a reflecting film having minimal absorption is to be formed.

It is preferable to use a rotationally asymmetric surface as a reflecting surface. By doing so, no chromatic aberration is produced in contrast to a case where it is used as a transmitting surface. Moreover, even if the tilt of the surface is small, the surface can bend light rays. Accordingly, the amount of other aberrations produced by the surface is also small. In other words, when the same refracting power is to be obtained, the amount of aberration produced by a reflecting surface is smaller than by a refracting surface.

In the objective optical system according to the present invention, it is desirable that at least one reflecting surface having a decentered rotationally asymmetric surface configuration should use a plane-symmetry free-form surface having only one plane of symmetry. A free-form surface (FFS) used in the present invention may be defined by the following equation:

$$
\begin{aligned}
Z = C_2 + \\
& C_3 y + C_4 x + \\
& C_5 y^2 + C_6 yx + C_7 x^2 + \\
& C_8 y^3 + C_9 y^2 x + C_{10} yx^2 + C_{11} x^3 + \\
& C_{12} y^4 + C_{13} y^3 x + C_{14} y^2 x^2 + C_{15} yx^3 + C_{16} x^4 + \\
& C_{17} y^5 + C_{18} y^4 x + C_{19} y^3 x^2 + C_{20} y^2 x^3 + C_{21} yx^4 + C_{22} x^5 + \\
& C_{23} y^6 + C_{24} y^5 x + C_{25} y^4 x^2 + C_{26} y^3 x^3 + C_{27} y^2 x^4 + C_{28} yx^5 + C_{29} x^6 + \\
& C_{30} y^7 + C_{31} y^6 x + C_{32} y^5 x^2 + C_{33} y^4 x^3 + C_{34} y^3 x^4 + C_{35} y^2 x^5 + C_{36} yx^6 + C_{37} x^7 \ldots
\end{aligned}
\qquad (a)
$$

where $C_m$ (m is an integer of 2 or higher) are coefficients.

In general, the above-described free-form surface does not have planes of symmetry in both the XZ- and YZ-planes. In the present invention, a free-form surface having only one plane of symmetry parallel to the YZ-plane is obtained by making all terms with odd-numbered powers of x zero. For example, in the above defining equation (a), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (a), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a free-form surface having only one plane of symmetry parallel to the XZ-plane. The use of a free-form surface having such a plane of symmetry makes it possible to improve the productivity.

Rotationally asymmetric aberrations due to decentration can be effectively corrected by using a free-form surface having either a plane of symmetry parallel to the YZ-plane or a plane of symmetry parallel to the XZ-plane.

It should be noted that the above defining equation is shown as merely an example, and that the feature of the present invention resides in that rotationally asymmetric aberrations due to decentration are corrected by a rotationally asymmetric surface having only one plane of symmetry. Therefore, the same advantageous effect can be obtained for any other defining equation.

Regarding an objective optical system designed to form an image relatively small in size as in the objective optical system according to the present invention, the objective optical system can be made compact in size on drawings by the principle of coefficient multiplication. However, in view of the actual production, it is not preferable to make the objective optical system excessively small in size because the thickness of the edge and center of the lens would be excessively reduced and the lens diameter would become excessively small, causing the production cost to increase unfavorably. In the case of a conventional optical system comprising a refracting lens system, if the optical system is constructed in conformity to a producible size, an unfavorably long distance must be ensured between refracting surfaces having power because the optical axis is straight, resulting in a waste of space. If the optical axis is spatially folded by using reflecting surfaces, an optical path necessary for image formation can be ensured by effectively utilizing a relatively small space. In this case, if the optical path length of the objective optical system is unnecessarily long, the optical system increases in size contrary to the purpose of effectively using the space by employing an arrangement in which the optical axis is folded by decentration. In addition, if the optical path length is excessively long in comparison to the image formed by the optical system, it is difficult to ensure the back focus required for disposing an electronic image pickup device for capturing an optical image.

The following is a description of a low-pass filter disclosed in JP(A) 7-325269, which is used in combination with the decentered prism optical system 104, which constitutes the above-described objective optical system according to the present invention.

The low-pass filter disclosed in JP(A) 7-325269 is capable of effectively removing causes of reduction in the image quality, such as moire fringes appearing when an endoscopic image is displayed on a monitor, and possible to implement at low cost. As shown in FIG. 16, the low-pass filter has a polyhedral structure consisting essentially of surface portions a, b, c and d formed by dividing the surfaces on both sides A and B into a plurality of surface portions and slanting them properly. Two lines normal to the portions a and b are in a skew relation to each other with an equal angle θa to an optical axis O. Lines normal to the other portions c and d are also in a skew relation to each other. The low-pass filter is given a filter function ito remove a spatial frequency component corresponding to double the distance between two images formed through the two surfaces A and B, thereby removing moire or the like due to an array of fibers in a fiber bundle or an array of light-receiving elements, for example.

Figure 17A:
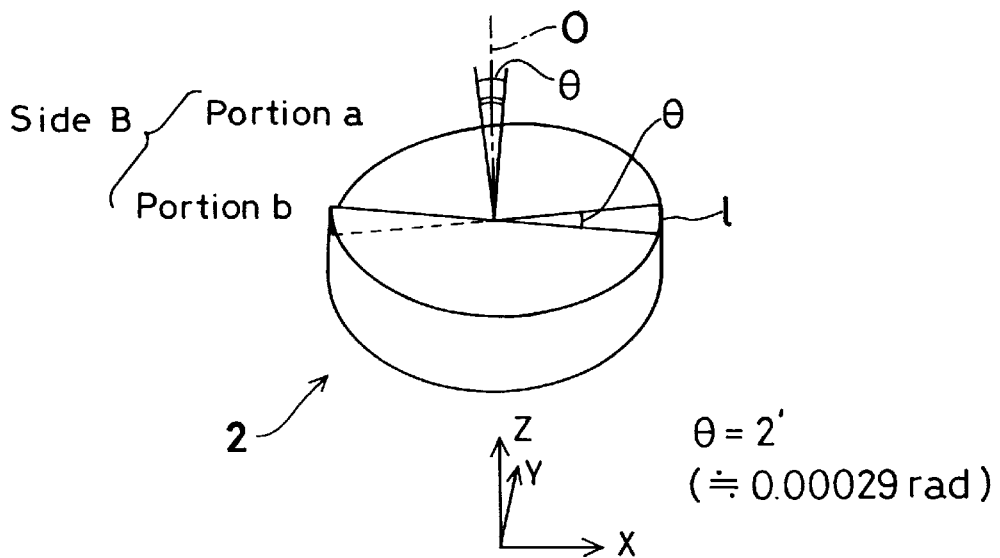
FIGS. 17A and 17B are diagrams showing a single-sided polyhedral lens used in a modification of the first embodiment of the prior application.
Figure 17B:
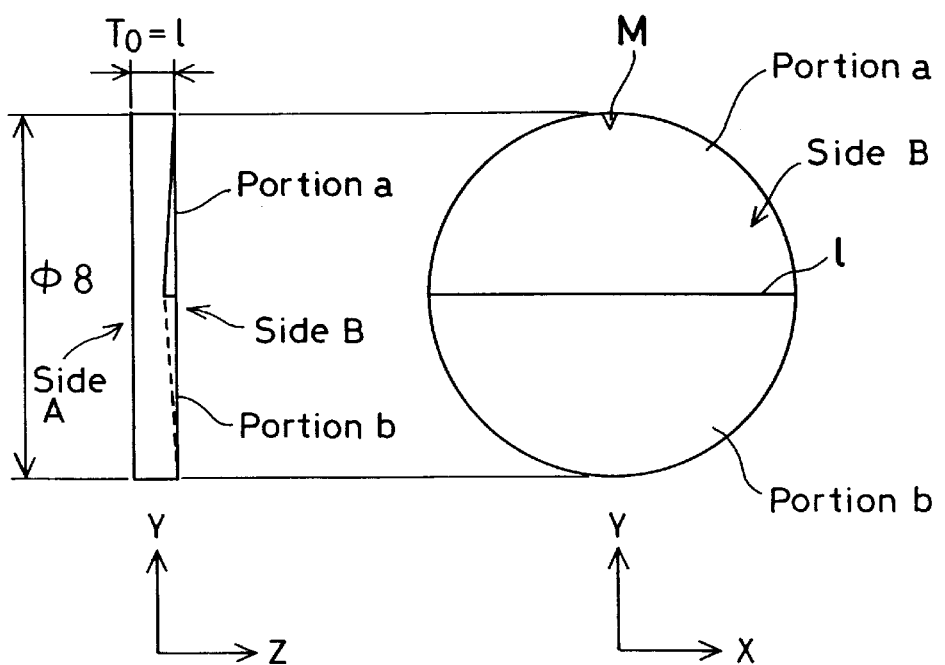

FIG. 16 shows a double-sided polyhedral lens 1 as an optical element having an optical low-pass filter function in a first embodiment of JP(A) 7-325269 (hereinafter referred to as "prior application"). The double-sided polyhedral lens 1 has a polyhedral lens formed on each side thereof. The polyhedral lens has two split surfaces which are skewed relative to each other like the blades of a propeller, as in the case of one side of a single-sided polyhedral lens 2 in a modification of the first embodiment of the prior application, which is shown in FIG. 17. First, the single-sided polyhedral lens 2 in the modification, which has a simpler structure, will be described.

As shown in FIG. 17, one side (assumed to be a side B, for example) of the single-sided polyhedral lens 2 is provided with two semicircular portions a and b which have an optical axis O in common with each other and have slant surfaces which are slanted in opposite directions to each other. Lines normal to the two slant surfaces are in a skew relation to each other and slant at an angle θ to each other.

Because the portions a and b are formed in a skew relation to each other as described above, the filter function to remove moire or the like can be satisfactorily exhibited even under defocus conditions as described later (see FIG. 22).

Assuming that the tilt angles of the lines normal to the two slant surfaces with respect to the optical axis O are θ1 and θ2, respectively, the following relationship holds:

$$\theta = \theta_1 - \theta_2 \quad (1)$$

(it should be noted that θ1 and θ2 express angles, inclusive of signs; in FIG. 17, θ1=−|θ2|)

Assuming that a Z-axis is taken in a direction parallel to the optical axis O, and X- and Y-axes are taken in a plane perpendicular to the Z-axis, for example, and further that the X-axis is taken in the direction of a boundary line l between the portions a and 2, data concerning the configuration of the side B of the single-sided polyhedral lens 2 is as follows:

For the portion a, Y is zero or positive (i.e. Y≧0). For the surface of the portion a, Z=P·X. For the portion b, Y is negative (i.e. Y<0). For the surface of the portion b, Z=−P·X. The parameter P expressing a slant surface is, for example, P=tan 1'≈0.00029. Here, 1'≈0.00029 rad. In this case, the angle θ is assumed to be θ=2'. As shown in part (b) of FIG. 17, the size of the single-sided polyhedral lens 2 is as follows: The diameter φ is 8 millimeters; the thickness $T_0$ is 1 millimeter, for example; and the refractive index n is 1.51633, for example.

It should be noted that the right-hand half of part (b) of FIG. 17 is a plan view, and the left-hand half is a side view. As shown in part (b) of FIG. 17, the side B is provided with a mark M for identifying the orientation of the optical element. The other side of the single-sided polyhedral lens 2, that is, side A, is a flat surface.

Figure 18:
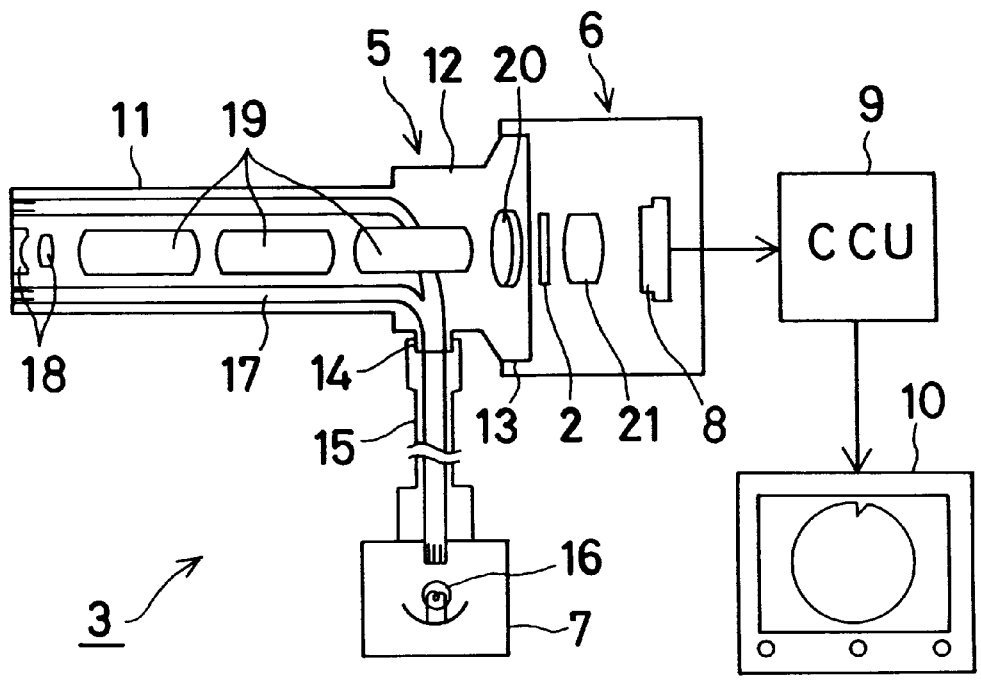
FIG. 18 is a diagram showing the arrangement of an endoscope apparatus according to the modification of the first embodiment of the prior application.

FIG. 18 shows an endoscope apparatus 3 as an optical apparatus according to a modification of the first embodiment of the prior application which uses the single-sided polyhedral lens 2. The endoscope apparatus 3 includes a hard endoscope 5 having an illumination optical system and an observation optical system; a television camera 6 attached to the hard endoscope 5 and containing an image pickup device; a light source unit 7 which supplies illuminating light to the hard endoscope 5; a CCU 9 which executes signal processing for a solid-state image pickup device 8, e.g. a CCD, contained in the television camera 6; and a color monitor 10 connected to the CCU 9 to display image signals.

The endoscope apparatus 3 is arranged to remove moire fringes due to the two-dimensional array of light-receiving elements (including mosaic filters) in the solid-state image pickup device 8 as an optical member, such as moire fringes caused by interference with the period of the array, and moire fringes caused by interference with color modulation.

The hard endoscope 5 has an insert part 11 formed from a hard sheathed tube. A grip portion 12 with an enlarged diameter is formed at the rear end of the insert part 11 so as to be gripped. An eyepiece portion 13 is formed at the rear end of the grip portion 12. The grip portion 12 is provided with a light guide socket 14. The hard endoscope 5 is detachably connected to the light source unit 7 through a light guide cable 15.

White illuminating light from a lamp 16 in the light source unit 7 is transmitted through a light guide serving as an illuminating light transmitting device in the light guide cable 15. The illuminating light is supplied through the light guide socket 14 to a light guide 17 in the hard endoscope 5. The transmitted illuminating light is emitted forward from an end surface attached to an illuminating window in the distal end portion of the insert part 11. Thus, an illumination optical system is formed.

An objective lens system 18 is mounted in a viewing window formed adjacent to the illuminating window. An image of a subject illuminated is formed by the objective lens system 18. The subject image is relayed by a relay lens system 19 as an image transmitting optical system which is disposed in the insert part 11 along an optical axis of the objective lens system 18 in coaxial relation to it so that a final image is formed in the vicinity of the eyepiece portion 13.

The image can be observed with the naked eye through an ocular lens (ocular optical system) 20 which forms an observation optical system. In a case where the television camera 6 is attached to the eyepiece portion 13, the image transmitted through the relay lens system 19 can be taken through the ocular lens 20 by the television camera 6. More specifically, the television camera 6 contains a single-sided polyhedral lens 2 having the function of an optical low-pass filter, an image-forming lens (imaging lens) 21, and a solid-state image pickup device 8 having color separating filters, e.g. mosaic filters. Thus, light passing through the ocular lens 20 passes through the single-sided polyhedral lens 2 and the imaging lens 21 to form an image on the solid-state image pickup device 8.

The image is photoelectrically converted by the solid-state image pickup device 8 into electric signals, which are then converted into a standard video signal by the CCU 9 to display an image on the color monitor 10. As shown for example in FIG. 19, the solid-state image pickup device 8 has pixels regularly arranged in a two-dimensional matrix on a photoelectric conversion surface. The pixels serve as light-receiving elements having a photoelectric conversion function.

Figure 19:
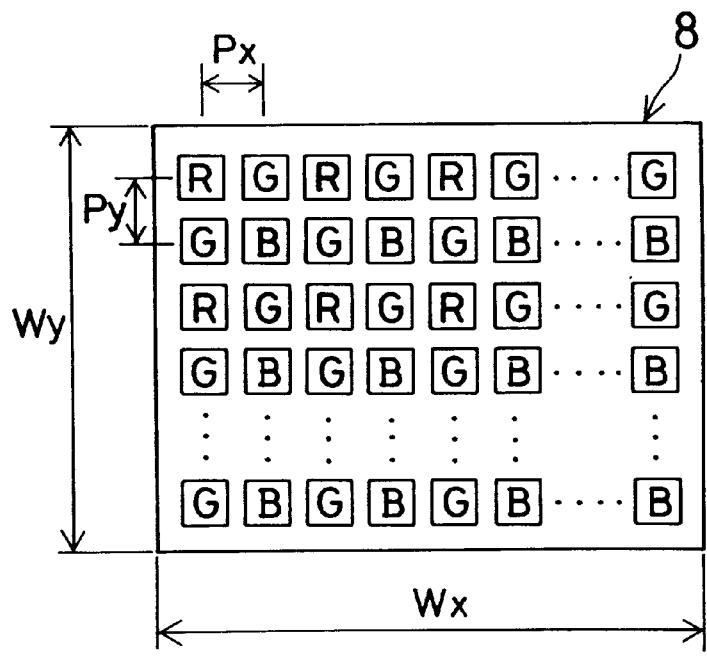
FIG. 19 is a diagram for explaining a pixel array of a solid-state image pickup device.

FIG. 19 shows the pixel array on the solid-state image pickup device 8. In the figure, R, G and B show that mosaic filters of R (red), G (green) and B (blue) are placed in front of the pixels. Light that is separated into R, G and B colors is photoelectrically converted to thereby perform a color image pickup operation. Reference symbols in the figure represent dimensions and periods as follows:

Px . . . the dimension in the horizontal direction of one pixel of the solid-state image pickup device 8;

Py . . . the dimension in the vertical direction of one pixel of the solid-state image pickup device 8;

Wy . . . the dimension in the vertical direction of the effective image pickup area of the solid-state image pickup device 8;

Wx . . . the dimension in the horizontal direction of the effective image pickup area of the solid-state image pickup device 8;

M . . . the period in the horizontal direction of the mosaic filters of the solid-state image pickup device 8, expressed in units of pixels; in the example shown in FIG. 19, M=2;

N . . . the period in the vertical direction of the mosaic filters of the solid-state image pickup device 8, expressed in units of pixels; in the example shown in FIG. 19, N=2.

It should be noted that M and N are regarded as M=N=1 in the case of a solid-state image pickup device 8 with no mosaic filters.

FIG. 20 shows the image pickup optical system of the television camera 6. Part (a) of FIG. 20 shows the orientation of the single-sided polyhedral lens 2. As shown in the figure, the single-sided polyhedral lens 2 is disposed such that the boundary line (dividing line) l between the portions a and b lies in the horizontal direction, that is, in parallel to the horizontal (breadthwise) direction of the solid-state image pickup device 8. In this case, the image separates into two images in the horizontal scanning direction of the solid-state image pickup device 8.

More specifically, part (b) of FIG. 20 shows a double image formed through the single-sided polyhedral lens 2. The two images are formed apart from each other in the horizontal direction by a distance d. It is assumed in the present invention that the horizontal (breadthwise) direction of the solid-state image pickup device 8 is set to the X-axis, and the vertical (lengthwise) direction to the Y-axis.

FIG. 21 is a diagram for explaining the function of removing moire fringes by forming a double image using the single-sided polyhedral lens 2 in the image pickup optical system. The basic idea of removing moire fringes is as follows: In sampling of an object image, if the sampling frequency is close to a frequency component contained in the object image, moire fringes appear. Therefore, the optical low-pass filter is set to frequency characteristics with which the relevant frequency component is removed.

As shown in FIG. 21, if an object which is bright and dark at a repeating period is imaged (on the image pickup surface of the solid-state image pickup device 8) through the single-sided polyhedral lens 2 and the image-forming lens 21, a first image is formed through the portion a, and a second image is formed through the portion b. In a case where the distance by which the first and second images are apart from each other is set to ½ of the period, if the intensity distributions of the two images are superimposed on one another, the peaks of the intensity distribution of one image fill the troughs of the intensity distribution of the other image, resulting in uniform intensity distributions. Consequently, the presence of moire fringes is unrecognizable. In other words, if such a double image is formed, a frequency component having a repeating period which is double the separation distance between the two images disappears. Accordingly, moire fringes can be removed by properly setting the relationship between the pixel sampling pitch (repeating period) and the image separation distance.

Figure 22A:
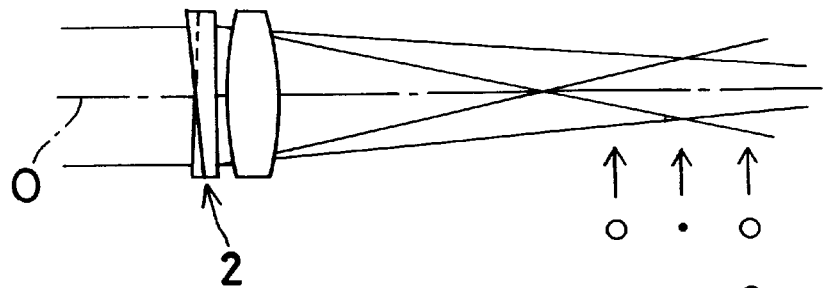
FIGS. 22A and 22B are diagrams showing that moire fringes can be removed even under defocus conditions.
Figure 22B:
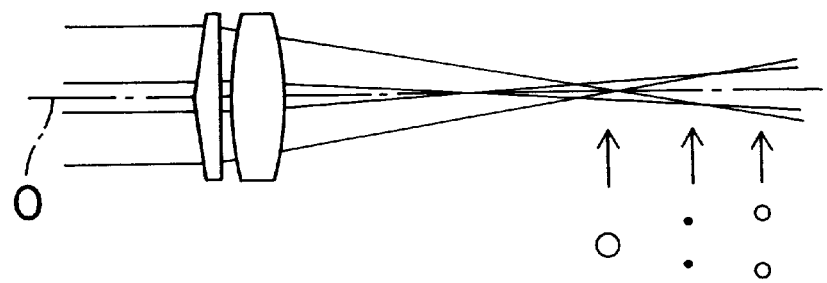

FIG. 22 is a diagram for explaining differences in action between an optical element satisfying the skew relationship between slant surfaces, which is employed in the embodiments and modifications of the prior application, and an optical element having surface portions which are merely symmetric with respect to a point. Part (a) of FIG. 22 shows the optical element in FIG. 17, that is, a portion of an optical system where the single-sided polyhedral lens 2, in which the slant surfaces satisfy the skew relationship, is disposed. Part (b) of FIG. 22 shows an optical system in which a prism-shaped member [an element shown in FIG. 1 of JP(A) 3-248695] having a flat surface at one side thereof and an angular surface at the other side thereof is disposed together with a lens.

With such an optical element disposed in an optical path, an image-forming optical system forms a double image of an object on an image plane. When the image plane is in focus, the same effect is obtained (a double image is formed) no matter which optical element is used. Under defocus conditions, the two optical elements differ in function from each other. To check the difference in function under defocus conditions, image-formation conditions at a position away from the image plane should be examined.

With the arrangement shown in part (b) of FIG. 22, light beams refracted by the slant surfaces of the prism-shaped member form respective images on the opposite sides of the optical axis [for example, in part (b) of FIG. 22, light on the upper side of the optical axis forms an image on the lower side of the optical axis at the image plane]. In this case, because light beams from the upper side of the optical axis and light beams from the lower side of the optical axis intersect each other, light gathers in a relatively narrow area in the vicinity of the optical axis. Accordingly, at a defocus position, image separation may become impossible to effect (or may become insufficient), and the low-pass filter function may become lost (or may become insufficient). That is, in part (b) of FIG. 22, a double image is formed at a defocus position away from the focus position in the rearward direction. However, at defocus position away from the focus position in the forward direction, the object image does not separate into two images. Thus, the low-pass filter function becomes lost (or insufficient). In other words, the shape of point images changes according to the defocus position; therefore, MTF (Modulation Transfer Function) changes undesirably.

In part (a) of FIG. 22, because the slant surfaces are in a skew relation to each other, light beams which form two images can be kept separate from each other even under considerably defocused conditions. Therefore, the low-pass filter function is not lost. That is, in part (a) of FIG. 22, a double image is formed at a defocus position rearwardly away from the focus position, and a double image is also formed at a defocus position forwardly away from the focus position. Moreover, there is substantially no change in the image separation distance (the distance between the two images). Therefore, the arrangement shown in part (a) of FIG. 22 exhibits the low-pass filter function even for a defocused image. Accordingly, the arrangement has the function of preventing the occurrence of moire fringes not only for an image formed in an in-focus state but also for an image formed in a defocused state. In other words, even under defocus conditions, the point images maintain a double-image configuration, and MTF is determined by multiplying the double image by the effect of defocus.

The single-sided polyhedral lens 2 having slant surfaces as shown in FIG. 17 can be produced by plastic or glass molding process using a metal form. Alternatively, the single-sided polyhedral lens 2 may be produced by coating a planar substrate non-uniformly.

In such a case, the surface configuration of a boundary portion (a portion surrounded by the dashed-and-dotted lines in FIG. 25, described later) between the two slant surfaces of the single-sided polyhedral lens 2 is not conformable to the design values but disordered. The low-pass filter function degrades at the disordered portion, and light passing through the disordered portion causes flare. To prevent the occurrence of these problems, for example, a substance which does not transmit light is provided on the disordered portion to form a light-blocking portion.

In a case where the polyhedral lens 2 is used in the television camera 6 (or a consumer VTR camera, a general TV camera, etc.), which is attached to the hard endoscope 5 as shown in FIG. 18, it is desirable to satisfy at least one of conditions (2) to (21) described below. In this modification of the first embodiment of the prior application, the polyhedral lens 2 is set so as to satisfy these conditions, thereby enabling moire fringes to be effectively removed even under defocus conditions in a case where moire fringes appear because of the sampling period or other cause. For conditional expressions, the magnification $\beta r$, the distance d between two images, etc. are defined as follows:

$\beta r$ . . . the magnification of a lens lying between the polyhedral lens 2 and the image-formation plane (the solid-state image pickup device 8 in this case);

Sf . . . the distance from the polyhedral lens 2 to an image formed by a lens forward of the polyhedral lens 2 (in the figure, the rightward direction is assumed to be a positive direction);

d . . . the distance between two images formed by the polyhedral lens 2 [see part (b) of FIG. 20];

n . . . the refractive index of the polyhedral lens 2.

It should be noted that in FIG. 18 there is another lens (e.g. the ocular lens 20 of the endoscope 5) in front of the polyhedral lens 2; if there is no lens in front of the polyhedral lens 2 (i.e. an image of an object is directly taken), Sf is the distance to the object.

First, to remove moire fringes due to the horizontal sampling of the mosaic filters, it is desirable to satisfy the following condition:

$$1/|2(n-1)\theta Sf\beta r|=1/(P\times M) \quad (2)$$

In the condition (2), the denominator of the left-hand side member expresses double the separation distance between the two images on the image plane, and the denominator of the right-hand side member expresses the distance of the sampling period. Moire fringes are removed by setting the variables so that these distances are equal to each other.

From the viewpoint of practical application, moire fringes may remain to some extent. Therefore, the condition (2) may be relaxed to give the following condition:

$$0.75/(P\times M)\leq 1/|2(n-1)\theta Sf\beta r|\leq 1.5/(P\times M) \quad (3)$$

The lower limit of the condition (3) corresponds to a frequency at which the value of MTF is about 40%. If the image separation distance is greater than this value, MTF on the low-frequency side becomes small, and the image contrast lowers to such an extent as to give rise to a problem. The upper limit corresponds to a frequency at which the value of MTF is about 70%. If the image separation distance is smaller than this value, the function of removing moire fringes is deteriorated.

To remove moire fringes due to luminance sampling, M=N=1 should be set in the conditions (2) and (3).

In the case of an NTSC television camera, electron-scope, etc., moire fringes due to the modulation of color signals appear. If it is necessary to remove such moire fringes, because the color subcarrier frequency is 3.58 MHz, it is desirable to satisfy the following condition:

$$0.75\cdot 40\cdot 3.58/Wy\leq 1/|2(n-1)\theta Sf\beta r|\leq 1.5\cdot 40\cdot 3.58/Wy \quad (4)$$

That is, $$107.4/Wy\leq 1/|2(n-1)\theta Sf\beta r|\leq 214.8/Wy \quad (5)$$

Here, the fact that 1 MHz is equivalent to 80 TV lines is used.

Figure 23:
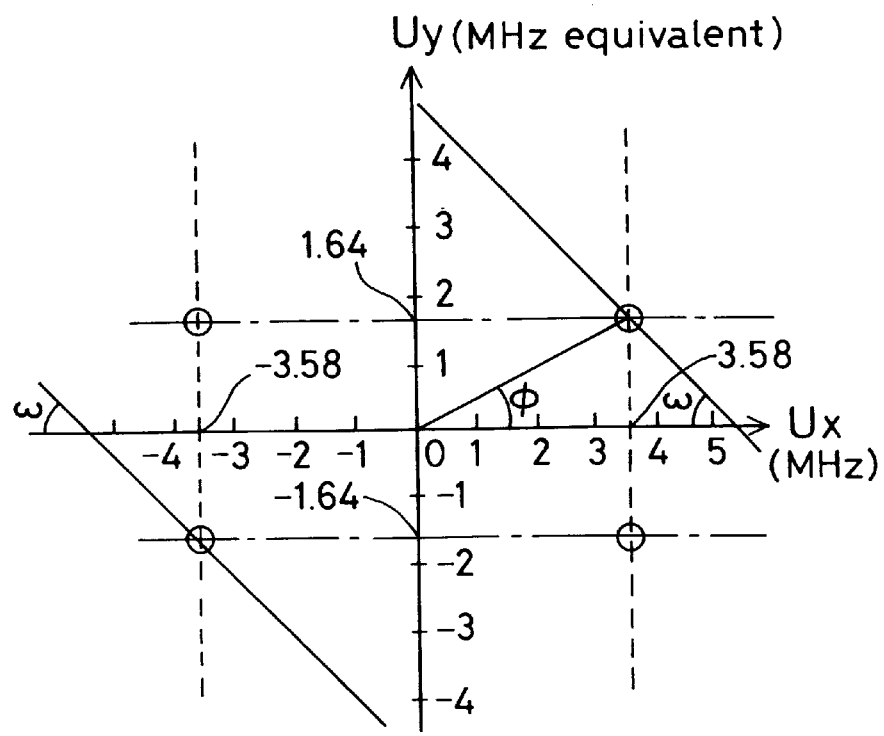
FIG. 23 is a diagram for explaining an operation of removing moire fringes due to color modulation by using trap lines in a spatial frequency plane.

If the single-sided polyhedral lens 2 is placed as shown in part (a) of FIG. 20, trap lines (lines where MTF=0) lie as shown by the dotted lines in FIG. 23 (which shows an operation of removing moire fringes due to color modulation by trap lines in a spatial frequency plane). However, moire fringes caused by color modulation appear at points marked with circles in FIG. 23. Therefore, the trap lines should pass through these points. If the dividing direction of the polyhedral lens 2 is tilted with respect to the horizontal direction by $\omega+90°$, trap lines lie as shown by the solid lines in FIG. 23. Accordingly, assuming that $\phi$ is defined by $$\phi=\text{arc tan } 1.64/3.58 \text{ i.e. } 1.64/3.58=\tan \phi \quad (6)$$

it is desirable to satisfy the following condition:

$$\cos(90°-\omega-\phi)\cdot 0.75\cdot 40\cdot A/Wy\leq 1/|2(n-1)\theta Sf\beta r|\leq \cos(90°-\omega-\phi)\cdot 1.5\cdot 40\cdot A \quad (7)$$

where $A=\sqrt{(1.64\cdot 1.64+3.58\cdot 3.58)}$ [here $\sqrt{(\ )}$ expresses the square root of the sum of the terms inside the parentheses]; in terms of square, $A\cdot A=1.64\cdot 1.64+3.58\cdot 3.58$. It should be noted that the angle is assumed to be positive when measured clockwise from a coordinate axis.

The condition (7) may be rewritten as follows:

$$\sin(\omega+\phi)118\cdot 136/Wy\leq 1/|2(n-1)\theta Sf\beta r|\leq \sin(\omega-\phi)236.27/Wy \quad (8)$$

Therefore, it is desirable to satisfy either the condition (7) or (8). That is, moire fringes due to color modulation can be removed by setting the dividing direction (the direction of the boundary line l) and so forth so that the condition (7) or (8) is satisfied. It should be noted that Ux and Uy in FIG. 23 denote spatial frequencies in the X and Y directions, respectively, on the image plane (in this case, the photoelectric conversion surface of the solid-state image pickup device 8).

Let us give a supplementary explanation of the above-mentioned trap lines. In an optical system, the relationship between the spatial frequency [the number of repetitions of bright and dark of an object (image) per millimeter] and the intensity is referred to as frequency characteristics as in the case of an electric circuit. A graph expressing frequency characteristics is called MTF (Modulation Transfer Function).

In the case of a lens, unlike an electric signal, an object (image) corresponding to it is two-dimensional. Therefore, trap lines are considered in a frequency plane. FIG. 23 shows a frequency plane. A coordinate axis representing the size of frequency response is perpendicular to the plane of the figure (accordingly, the size of frequency response at each frequency is not recognizable in FIG. 23) A trap line is a line connecting points where MTF=0, i.e. the frequency response is zero.

It should be noted that in the case of a PAL TV camera or the like, 3.58 MHz in the conditions (4) and (7) should be replaced with 4.43 MHz.

In the case of an image pickup apparatus, e.g. a television camera of a high-definition television (abbreviated as "HDTV"), an electron-scope, etc., the effective sample number per line (scanning line) is specified as 1920 (the January 1991 issue of the Journal of Television Technology, p. 20). Therefore, moire fringes due to luminance digital sampling can be removed if the following condition is satisfied:

$$0.75 \cdot (1920/Wx) \leq 1/|2(n-1)\theta Sf\beta r| \leq 1.5 \cdot (1920/Wx) \quad (9)$$

To remove moire fringes due to color signal sampling, it is desirable to satisfy the following condition because the color digital sample number is specified as 960 (the above-mentioned Journal of Television Technology):

$$0.75 \cdot (960/Wx) \leq 1/|2(n-1)\theta Sf\beta r| \leq 1.5 \cdot (960/Wx) \quad (10)$$

In a case where the number npx of horizontal pixels of the solid-state image pickup device 8 is short of 1920, the left-hand term and the right-hand term of each of the conditions (9) and (10) should be multiplied by $$npx/1920 \quad (11)$$

(In this description, when a reference is made to the condition (11), it means simply an inequality in which the condition (9) or (10) is multiplied by npx/1920).

The polyhedral lens 2 can be used to remove moire fringes appearing in a combination of a fiber-scope using as an image transmitting device an image guide serving as an optical member which transmits pixels through fibers of a two-dimensional array of fibers in a fiber bundle, and an electronic image pickup system, e.g. a TV camera. FIG. 24 shows an image of an array of fibers in a fiber bundle. As illustrated in the figure, fibers are arranged in a staggered format (the distance between each pair of adjacent fibers is equal to each other). Assuming that the fiber pitch in the fiber bundle image is Pf (in this case, the image may be considered to be the real image on the solid-state image pickup device 8), it is desirable to satisfy the following condition:

$$0.75/(Pf \cdot \sin 60°) \leq 1/|2(n-1)\theta Sf\beta r| \leq 1.5/(Pf \cdot \sin 60°) \quad (12)$$

In a case where some fiber-scopes and an electronic image pickup system are combined together, the Pf of any of the fiber-scopes or an approximate mean of Pf values of the fiber-scopes should satisfy the condition (12). This also applies to Pf in the conditions (22), (23) and (24) described later.

Assuming that $$U_0 = 1/|2(n-1)\theta Sf\beta r| \quad (13)$$

MTF is given by $$MTF = \cos(U/U_0 \cdot \pi/2) \quad (14)$$

Therefore, if the equal sign of the condition (12) is valid, MTF at the frequency of 1/(Pf·sin 60°) at that time is 0.5. Thus, the extent of moire fringes can be reduced to a half or less.

In many cases, a polyhedral lens 2 such as that shown in FIG. 17 is produced by plastic or glass molding process using a metal form. Alternatively, the polyhedral lens 2 may be produced by coating a planar substrate non-uniformly. In such a case, the surface configuration of a boundary portion between the two slant surfaces of the polyhedral lens 2, which is surrounded by the dashed-and-dotted lines in part (a) of FIG. 25, is not conformable to the design values but disordered. Assuming that an area on the polyhedral lens 2 which is occupied by marginal rays is Sm [the portion surrounded by the dotted line in part (a) of FIG. 25], the area Sα occupied by the disordered portion [the hatched portion in part (a) of FIG. 25] is desirably set so as to satisfy the following condition:

$$S\alpha/Sm < 0.3 \quad (15)$$

If Sα/Sm is not smaller than 0.3, the image is disturbed by flare, which is unfavorable for practical use.

In the case of an endoscope of high-grade optical performance which uses a relay lens and an image fiber bundle having a large number of fibers, for example, an image of better contrast can be obtained by satisfying the following condition:

$$S\alpha/Sm < 0.12 \quad (16)$$

The foregoing matter was experimentally confirmed by using the single-sided polyhedral lens 2 shown in FIG. 17. The experiment revealed that the maximum value of the deviation in surface configuration of the defective portion Sα was not more than 10 micrometers.

Part (a) of FIG. 26 is a detailed view of a portion having a disordered surface configuration. Part (b) of FIG. 26 is a detailed view of a portion having a disordered surface configuration in a case where there is a difference in height between two slant surfaces. Part (a) of FIG. 26 shows the condition of a section taken along the line A in part (c) of FIG. 26. Part (b) of FIG. 26 shows the condition of a section taken along the line B in part (c) of FIG. 26. That is, part (a) of FIG. 26 shows a portion where the two slant surfaces are at the same height, whereas part (b) of FIG. 26 shows a portion where the two slant surfaces are different in height from each other.

Properly speaking, the section taken along the line A should be a straight line. However, a recess is undesirably formed in the middle between the two slant surfaces as shown in part (a) of FIG. 26. The section taken along the line B should have a squarely bent shape. However, the corners are deformed as shown in part (b) of FIG. 26. First, a portion having a disordered surface configuration in the case of part (a) of FIG. 26 is defined as follows: A portion is defined as one that has a disordered surface configuration when the amount of deviation Hα from a plane obtained by smoothly extending a portion which is away from the boundary line satisfies the following condition:

$$H\alpha > \lambda \quad (17)$$

where λ is a mean of working wavelengths.

Alternatively, a portion is defined as one that has a disordered surface configuration when the angle α formed between a tangential plane at a point on the surface and the above-described extension plane satisfies the following condition:

$$\alpha > 1° \quad (18)$$

In a case where there is a difference in height between two surfaces as shown in part (b) of FIG. 26, Hα is defined by the amount of deviation from a smooth extension (the dotted line in the figure) of each surface. The same is the case with the angle α. It is desirable that the height difference [G in part (b) of FIG. 26] between the two surfaces should satisfy the following condition:

$$G < 10 \text{ micrometers} \quad (19)$$

If G is not smaller than 10 micrometers, when a bright point-like object is seen, intense emission lines unfavorably appear around the object.

A low-pass filter used in the present invention, as described later, is designed such that as the size of the effective diameter increases, the height difference between two slant surfaces becomes larger. When the low-pass filter is used in an endoscope, because the size of the pupil is about 7 millimeters at the most, the size of the low-pass filter is also of the order of 7 millimeters. In such a case, it is preferable to satisfy the condition (19).

A substance which does not transmit light may be provided to cover substantially the portion Sα in FIG. 25 to prevent flare which would otherwise be caused by light passing through the portion having a disordered surface configuration. Examples of such a substance include $CrO_2$—Cr—$CrO_2$ coating, black paint, etc. The light-blocking portion may be provided on the reverse side of the polyhedral lens 2 at a position which substantially covers the portion Sα. Part (b) of FIG. 25 shows an example in which a light-blocking portion 23 is provided by coating.

Figure 27:
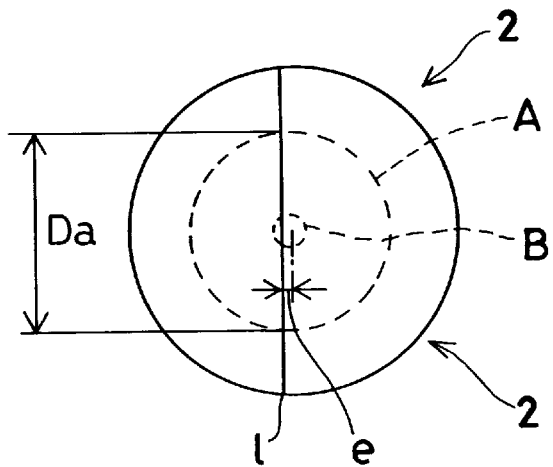
FIG. 27 is a diagram showing a polyhedral lens formed such that a boundary thereof is decentered.

To avoid the disordered surface configuration from causing problems, the boundary portion may be decentered with respect to the bundle of marginal rays as shown in FIG. 27. By doing so, when the bundle of marginal rays is large in diameter, the portion Sα having a disordered surface configuration becomes small relative to Sm (A in FIG. 27), so that problems will not arise. When Sm is small (B in FIG. 27), the boundary line l lies outside the ray bundle. Therefore, the contrast of the image can be kept, although the moire removing function is lost.

It is desirable that the amount of eccentricity (displacement) e of the boundary line should satisfy the following condition:

$$e/Da \leq 0.25 \qquad (20)$$

If e/Da exceeds 0.25, the moire removing function becomes deteriorated even when Sm is in the state A in FIG. 27.

Figure 28:
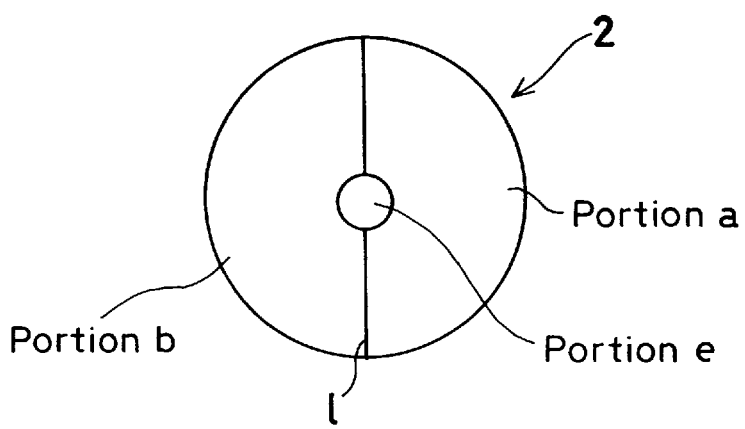
FIG. 28 is a diagram showing a polyhedral lens in which a central portion at the boundary thereof is formed into a flat surface by grinding.

Alternatively, as shown in FIG. 28, the surface of the polyhedral lens 2 may be divided into three surface portions (i.e. a portion a, a portion b, and a central portion e) such that the boundary between the surface portions does not lie in the central portion of the polyhedral lens 2. This may be realized as follows: In making of a mold for forming the polyhedral lens 2, after both surfaces have been ground, only the central portion is polished to form a portion e having disorder removed from the surface thereof. In this case, the boundaries between the three split surfaces do not always need to be clear.

Alternatively, a portion of the mold which corresponds to the area Sα in part (a) of FIG. 25 may be smoothed by regrinding or polishing, thereby removing a portion of the mold which is higher than the configuration according to the design values. The examples shown in FIGS. 25, 27 and 28 are particularly effective when combined with an image pickup apparatus whose pupil diameter is variable, such as a television camera, an electron-scope, an adapter, a hard endoscope, or a fiber-scope.

Figure 29:
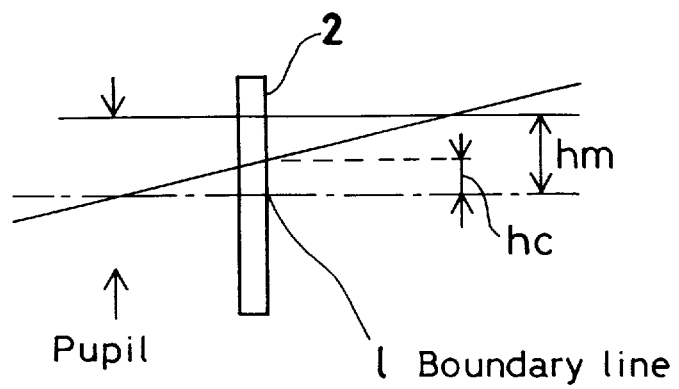
FIG. 29 is a diagram showing the reason why a polyhedral lens is desirably disposed in the vicinity of a pupil.

When placed in an optical system, the polyhedral lens 2 is preferably disposed in the vicinity of the pupil position, as has already been stated above. Let us examine this more specifically. FIG. 29 shows a positional relationship between the pupil and the polyhedral lens 2. In FIG. 29, hm and hc denote the marginal ray height and the extra-axial principal ray height, respectively, at the polyhedral lens surface of the polyhedral lens 2. Here, it is desirable to satisfy the following condition:

$$|hc/hm| < 0.8 \qquad (21)$$

If hc is large to such an extent that the condition (21) is no longer satisfied, a large difference is produced between the proportions of the areas where extra-axial rays pass through the two surfaces of the polyhedral lens 2. Consequently, the moire removing function is deteriorated. Even when the condition (21) is not satisfied, if the polyhedral lens 2 is moved to a position close to the pupil, the condition (21) can be satisfied. Thus, it is desirable to set the polyhedral lens 2 in the vicinity of the pupil position.

It should be noted that the polyhedral lens 2 need not perpendicularly intersect the optical axis O, but may be tilted with respect to the optical axis O up to 10-odd degrees. According to the foregoing modification of the first embodiment of the prior application, the endoscope apparatus employs a single-sided polyhedral lens 2 with slant surfaces that are in a skew relation to each other, which is allowed to exhibit a great optical low-pass filter function with respect to moire fringes due to the pixel array of the solid-state image pickup device 8, the sampling period, etc. by setting the polyhedral lens 2 so that the conditions for moire removal are satisfied. Accordingly, moire fringes can be satisfactorily removed from not only an image formed on the image pickup surface of the solid-state image pickup device 8 in an in-focus state but also an image formed in a defocus state (the moire removing function is greater than that of the point-symmetry optical filter disclosed in JP(A) 3-248695).

Accordingly, the endoscopic image displayed on the color monitor 10 is free from moire fringes and of good image quality. Moreover, the moire removing function can be realized at much lower cost than in the case of using a crystal filter.

The following is a description of a double-sided polyhedral lens 1 which enables the filter function to be enhanced in comparison to the single-sided polyhedral lens 2, together with an endoscope apparatus according to the first embodiment of the prior application which uses the double-sided polyhedral lens 1.

FIG. 16 shows a double-sided polyhedral lens 1 used in the first embodiment of the prior application. The double-sided polyhedral lens 1 has two split surfaces on each side thereof. The two surfaces are skewed relative to each other like the blades of a propeller, as in the case of the side B of the single-sided polyhedral lens 2. That is, as shown in part (a) of FIG. 16, the double-sided polyhedral lens 1 has two semicircular slant surface portions a and b formed on one side A thereof as in the case of the single-sided polyhedral lens 2. The portions a and b have an optical axis O substantially in common with each other and lie on both sides of a boundary line 1a passing perpendicularly to the optical axis O.

As shown in part (b) of FIG. 16, the double-sided polyhedral lens 1 has two semicircular slant surface portions c and d formed on the other side B thereof as in the case of the single-sided polyhedral lens 2. The portions c and d have the optical axis O substantially in common with each other and lie on both sides of a boundary line 1b passing perpendicularly to the optical axis O. As shown in the right-hand half of part (c) of FIG. 16, the boundary line 1a on the side A and the boundary line 1b on the side B are substantially perpendicular to each other.

Lines normal to the two slant surfaces on the side A substantially at the respective centers are in a skew relation to each other and slant at an angle θa to each other. On the side B also, lines normal to the two slant surfaces substantially at the respective centers are in a skew relation to each other and slant at an angle θb to each other.

Because the slant surface portions are formed in a skew relation to each other as described above, the low-pass filter function can be satisfactorily exhibited even in the case of an out-of-focus (defocused) image, as stated above. In FIG. 16, the angles θa and θb are set, for example, to θa=θb=2'40".

Assuming that a Z-axis is taken in a direction parallel to the optical axis O, and X- and Y-axes are taken in a plane perpendicular to the Z-axis, and further that the X-axis is taken in the direction of the boundary between the portions a and b, for example, data concerning the configuration of the side A of the double-sided polyhedral lens 1 is as follows:

For the portion a, Y is zero or positive (i.e. Y≧0). For the surface of the portion a, Z=P·X. For the portion b, Y is negative (i.e. Y<0). For the surface of the portion b, Z=−P·X. The parameter P expressing a slant surface is, for example, P=tan 1'20"≈0.0004. As shown in part (c) of FIG. 16, the size of the double-sided polyhedral lens 1 is as follows: The diameter φ is 8 millimeters; the thickness $T_0$ is 1 millimeter, for example; and the refractive index n is 1.51633, for example.

It should be noted that the right-hand half of part (c) of FIG. 16 is a plan view, and the left-hand half is a side view. As shown in part (c) of FIG. 16, the side A is provided with a mark M for identifying the orientation of the optical element.

It should be noted that the angles θa and θb of the double-sided polyhedral lens 1 may be unequal to each other and should be properly selected in conformity to the range of Pf values of some fiber-scopes to be combined and Px, Py, N, M and so forth of the solid-state image pickup device 8.

It is desirable to set the angles θa and θb so that the angle θa or θb satisfies at least two of the conditions (2), (3), (5), (7), (8), (9), (10) and (11), in which the angle θa or θb is substituted for the angle θ. By doing so, it is possible to allow the double-sided polyhedral lens 1 to give advantageous effects similar to those of the modification shown in FIG. 17 and to have different filter functions at the two sides thereof. Therefore, the double-sided polyhedral lens 1 can remove more causes of reduction in the image quality in observation or the like than the single-sided polyhedral lens 2. Thus, the double-sided polyhedral lens 1 gives even more remarkable effects than the single-sided polyhedral lens 2. The double-sided polyhedral lens 1 can be produced at much lower cost than a crystal filter having comparable action and effect as in the case of the modification.

It is desirable to set each of the sides A and B of the double-sided polyhedral lens 1 so that at least one of the conditions (15), (16), (19), (20) and (21) is satisfied. Advantageous effects produced by doing so are the same as those in the case of the single-sided polyhedral lens 2 shown in FIG. 17.

Figure 30:
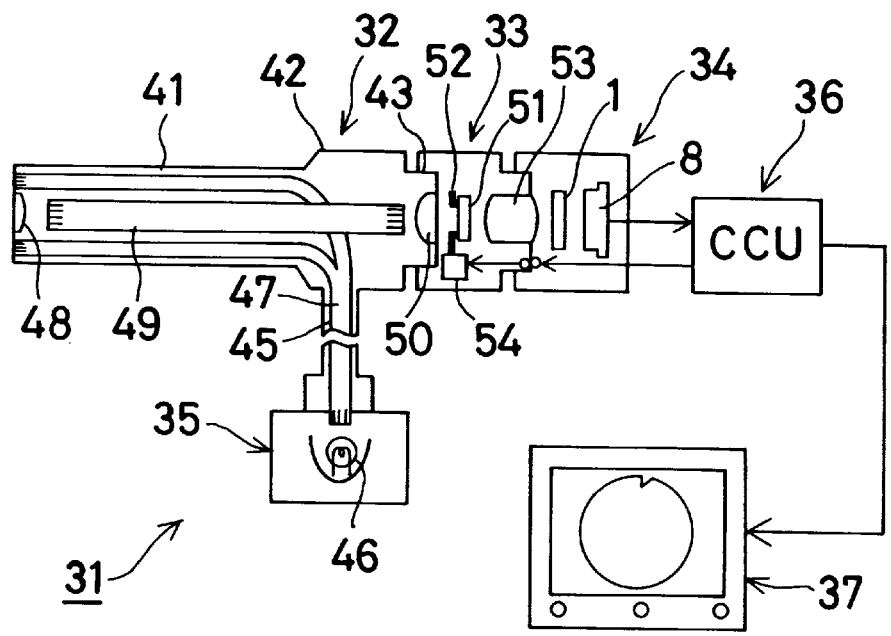
FIG. 30 is a diagram showing the whole arrangement of an endoscope apparatus according to the first embodiment of the prior application.

MTF of the double-sided polyhedral lens 1 is given by the product of MTFs of the two sides thereof. Accordingly, the double-sided polyhedral lens 1 enables the number of trap lines to be increased and makes it possible to further enhance the low-pass filter function. This is particularly effective in a combination of a fiber-scope in which intense moire fringes appear and a television camera. FIG. 30 shows an endoscope apparatus 31 according to the first embodiment of the prior application as an optical apparatus having such an arrangement (more specifically, an image pickup apparatus having an image pickup function).

The endoscope apparatus 31 includes a fiber-scope 32 serving as a soft endoscope, which has an illumination optical system and an observation optical system; a pickup lens adapter 33 removably attached to the fiber-scope 32 and containing a pickup lens; a television camera 34 removably attached to the pickup lens adapter 33 and containing an image pickup device; a light source unit 35 which supplies illuminating light to an illuminating light transmitting device of the fiber-scope 32; a CCU 36 which executes signal processing for a solid-state image pickup device 8, e.g. a CCD, contained in the television camera 34; and a color monitor 37 connected to the CCU 36 to display image signals.

The fiber-scope 32 has a soft, long and narrow insert part 41 which has flexibility and is inserted into the body cavity or the like. A thick control part 42 is formed at the rear end of the insert part 41 and provided with a bending control device (not shown). An eyepiece portion 43 is formed at the rear end of the control part 42. A light guide cable 45 extends from the control part 42 and is detachably connected to the light source unit 35.

White illuminating light from a lamp 46 in the light source unit 35 is supplied to a light guide 47 in the light guide cable 45. The transmitted illuminating light is emitted forward from an end surface attached to an illuminating window in the distal end portion of the insert part 41. Thus, an illumination optical system which illuminates a subject such as an affected part is formed.

An objective lens 48 is mounted in a viewing window formed in the distal end portion at a position adjacent to the illuminating window. An image of a subject illuminated is formed by the objective lens 48. A distal end surface of an image guide 49 is disposed at a position where the subject image is formed by the objective lens 48. The image guide 49 is formed from a bundle of fibers to have an image transmitting function. The image guide 49 inserted in the insert part 41 transmits the image to a rear end surface thereof at the rear side of the insert part 41. The image transmitted to the rear end surface can be observed with the naked eye through an ocular lens 50 which is provided in an eyepiece window of the eyepiece portion 43 to form an observation optical system.

In a case where the television camera 34 is attached to the eyepiece portion 43 through the pickup lens adapter 33, the image transmitted through the image guide 49, which serves as an image transmitting optical system, is taken through the ocular lens 50, an iris 52, a second double-sided polyhedral lens 51 and a pickup lens 53, which are provided in the pickup lens adapter 33, and a final image is formed on the solid-state image pickup device 8 having color separation filters, e.g. mosaic filters, through a first double-sided polyhedral lens 1 disposed in the television camera 34. Thus, an image pickup device (or an image pickup apparatus) is formed. The image is photoelectrically converted by the solid-state image pickup device 8 into electrical signals, which are then converted into a standard video signal by the CCU 36 to display a color image on the color monitor 37, which serves as a color display device.

The CCU 36 generates a light-control signal as an average brightness value, for example, by integrating the luminance signal over one frame period, and outputs the signal to an iris driver 54 provided in the pickup lens adapter 33 to vary the amount of opening of the iris 52. The iris 52 is controlled such that when the average level of the luminance signal is high, the iris 52 is narrowed down, whereas, when it is low, the iris 52 is opened wider. That is, an auto-iris control mechanism is formed. Thus, the brightness of the endoscopic image displayed on the color monitor 37 is automatically controlled to a level suitable for observation at all times.

In the first double-sided polyhedral lens 1 used in the first embodiment of the prior application, the polyhedral lens surfaces on the sides A and B are each set so as to satisfy the condition (2) [or the condition (3)] and the condition (4) [or the condition (5) or (7) or (8)], thereby removing moire fringes due to mosaic filters and moire fringes due to color signal modulation.

In the second double-sided polyhedral lens 51, the polyhedral lens surfaces on the sides A and B are each set so as to satisfy the condition (12), thereby two-dimensionally removing moire fringes due to the fiber pitch Pf of the fiber bundle image as shown in FIG. 24.

The second double-sided polyhedral lens 51 may be set as shown in FIG. 35 (described later), and trap lines may be set as shown in FIG. 36, thereby removing dark due to clad portions of the fibers in a fiber-scope image which would otherwise appear conspicuously. The single-sided polyhedral lens 2 may be used in place of the second double-sided polyhedral lens 51 and set so as to satisfy the condition (12).

The endoscope apparatus 31 according to the first embodiment of the prior application has the function of satisfactorily removing moire fringes from not only an in-focus image but also a defocused image as in the case of the modification that uses the single-sided polyhedral lens 2. Therefore, it is possible to obtain an image of good quality without moire fringes even when an affected part or the like is observed.

Moreover, because the first embodiment of the prior application uses a double-sided polyhedral lens, which has a polyhedral lens formed on each side thereof, it is possible to dissolve more causes of reduction in the image quality than in the case of the modification that uses the single-sided polyhedral lens 2, and hence possible to obtain an image of good quality. In addition, advantageous effects similar to those obtained by using a crystal filter can be produced at much lower cost.

In the first embodiment of the prior application, shown in FIG. 30, the television camera 34 may be combined with the a hard endoscope 5 using a relay lens system in which moire does not appear to a great extent, by replacing the pickup lens adapter 33 with a pickup lens adapter 56 which is provided with a cover glass 55 in place of the double-sided polyhedral lens 51.

Figure 31:
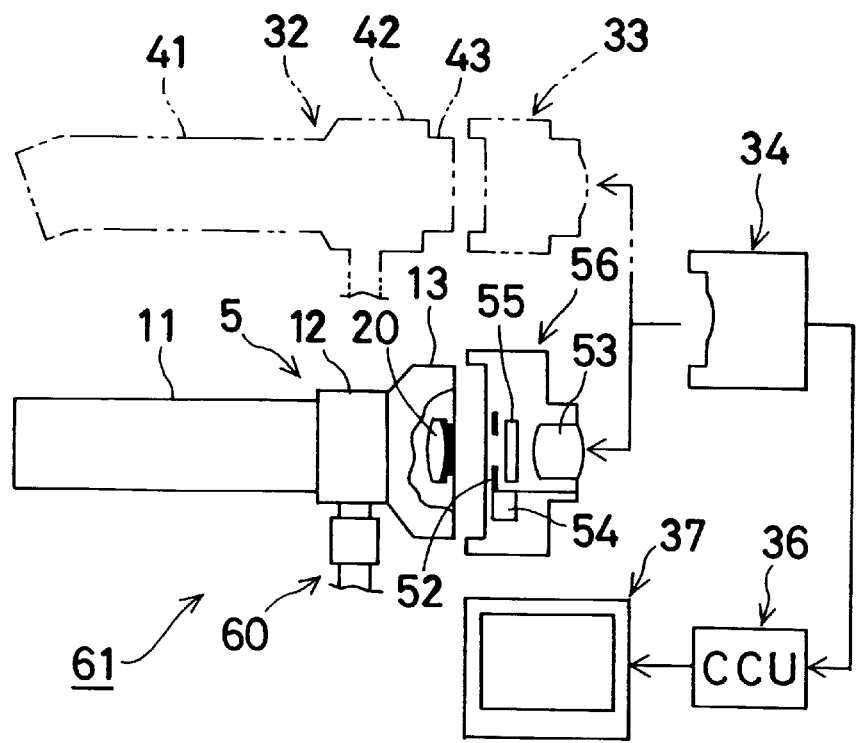
FIG. 31 is a diagram showing the arrangement of a system according to a second embodiment of the prior application.

By doing so, it is possible to implement an endoscope apparatus 60 having an optimal low-pass filter function simply by exchanging the pickup lens adapter 33 for the pickup lens adapter 56. FIG. 31 is a diagram showing the arrangement of an endoscope system 61 according to a second embodiment of the optical apparatus of the prior application which enables the endoscope apparatuses 31 and 60 to be implemented (in FIG. 31, illustration of the light source unit is omitted).

In FIG. 31, the endoscope apparatus 60 is shown by the solid lines. In the endoscope apparatus 60, the hard endoscope 5 is used in place of the fiber-scope 32 in FIG. 30, and the pickup lens adapter 33 is replaced with the pickup lens adapter 56 correspondingly. The television camera 34, which is used in common, is removably attached to the pickup lens adapter 56.

In the endoscope apparatus 60, it is also possible to remove moire fringes due to mosaic filters and moire fringes due to color signal modulation and hence possible to obtain an image of good quality. It should be noted that the hard endoscope 5 has basically the same arrangement as that shown in FIG. 18, for example.

FIG. 32 shows a fiber-scope 70 according to a third embodiment of the optical apparatus of the prior application. In the fiber-scope 70, a double-sided polyhedral lens 71 is provided in the vicinity of the pupil of the ocular lens 50. The angles θa and θb of the double-sided polyhedral lens 71 are set so as to satisfy the following conditions:

$$0.75/Pf \leq 1/|2(n-1)\theta a Sf\beta r| \leq 1.5/Pf \qquad (22)$$

$$0.75/Pf \leq 1/|2(n-1)\theta b Sf\beta r| \leq 1.5/Pf \qquad (23)$$

Further, the double-sided polyhedral lens 71 is set so that the angle ψ formed between the boundary lines 1a and 1b satisfies the following condition:

$$45° \leq \psi \leq 75° \qquad (24)$$

Thus, the double-sided polyhedral lens 71 is arranged to be capable of removing all fundamental spatial frequency spectra in the fiber bundle array. It should be noted that βr is the magnification of an ocular lens 50 lying between the polyhedral lens 71 and the position of the image-formation plane, and Sf is the distance from the polyhedral lens 71 to an image formed by the ocular lens 50 forward of the polyhedral lens 71.

More specifically, as shown in parts (a) and (b) of FIG. 33, the directions of the boundary lines 1a and 1b of the double-sided polyhedral lens 71 are set parallel to the array directions of the fiber bundle (i.e. an array direction J in a horizontal direction and an array direction K in an obliquely upward direction; the boundary line 1a is parallel to the direction J, and the boundary line 1b is parallel to the direction K). Accordingly, the angle Ψ formed between the array directions J and K of the fiber bundle, which are horizontal and obliquely upward directions, respectively, is equal to the angle ψ between the boundary lines 1a and 1b (ψ=Ψ).

FIG. 34 shows spatial frequency spectra (marked with circles) of a fiber bundle image obtained with the above-described arrangement, together with trap lines (dotted lines) obtained by the double-sided polyhedral lens 71. It should be noted that in the case of image fibers arrayed at random, a mean value should be taken as Pf. Alternatively, the double-sided polyhedral lens 1 shown in FIG. 16 my be employed in place of the double-sided polyhedral lens 71 in FIG. 32, thereby forming an arrangement similar to that of the first modification.

That is, the double-sided polyhedral lens 1 shown in FIG. 16, in which the boundary lines 1a and 1b are arranged to intersect each other at right angles as shown in part (a) of FIG. 35, may be disposed such that the boundary line 1a is parallel to the direction J with respect to the fiber bundle array shown in part (b) of FIG. 35. At this time, one of the angles θa and θb should preferably satisfy the condition (22) or (23). The other of the angles θa and θb should preferably satisfy the condition (12) as rewritten by substituting the angle θa or θb for the angle θ.

FIG. 36 shows spatial frequency spectra (marked with circles) of a fiber bundle image obtained with the above-described arrangement, together with trap lines (dotted lines) obtained by the double-sided polyhedral lens 1. As shown in FIG. 36, the fundamental frequency of the fiber bundle can be reduced close to zero. Therefore, the clad portions are inconspicuous, and moire fringes are also inconspicuous when the fiber-scope is combined with a TV camera.

Although in the embodiments shown in FIGS. 18, 33 and 35 the trap lines where MTF of a polyhedral lens is zero are parallel to the X-axis or the Y-axis, it should be noted that the trap lines do not always need to be parallel to the X-axis or the Y-axis for the purpose of removing moire fringes when a television camera is attached to the fiber-scope or for the purpose of removing dark due to the clad portions or of removing dark due to the clad portions during observation through the fiber-scope with the naked eye.

The arrangement may be such that, as shown in part (a) of FIG. 37, the boundary lines 1a and 1b are disposed at ±45° to the X-axis so that trap lines (dotted lines) pass in the vicinities of points (marked with circles) of the fundamental frequency (or higher-order frequencies) of the fibers.

Figure 38:
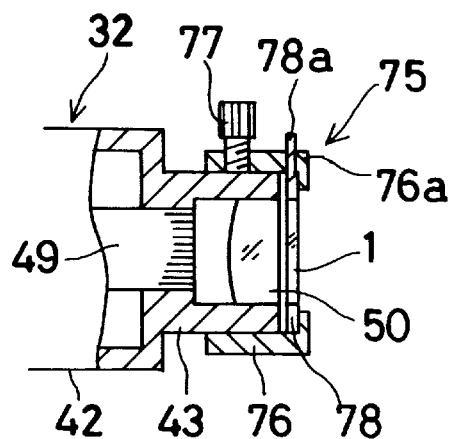
FIG. 38 is a sectional view showing a dark removing ocular adapter according to a fourth embodiment of the prior application.

It is also possible to adopt the structure of a fourth embodiment of the optical apparatus of the prior application as shown in FIG. 38, thereby removing dark due to the clad portions during observation through the fiber-scope with the naked eye, for example. That Is, the double-sided polyhedral lens 1, for example, which is accommodated in a dark removing eyepiece adapter 75 shown in FIG. 38 is arranged to be rotatable, thereby enabling the low-pass filter function to be variable.

The eyepiece adapter 75 has a ring-shaped frame member 76 serving as a mounting member for the eyepiece adapter 75. The forward end portion of the frame member 76 is fitted to the eyepiece portion 43 of an existing fiber-scope (e.g. denoted by reference numeral 32 in FIG. 30) and secured by using a fixing screw 77, thereby enabling the eyepiece adapter 75 to be removably attached to the eyepiece portion 43). A lens frame 78 having the double-sided polyhedral lens 1 mounted thereon is fitted to the inner peripheral surface of the rear end of the frame member 76, thereby being rotatably accommodated in the frame member 76.

The frame member 76 is provided with a groove 76a extending circumferentially over 90 degrees. A pin 78a projecting from the lens frame 78 extends through the groove 76a to project from the frame member 76. By rotating a projecting portion of the pin 78a which projects from the groove 76a, the double-sided polyhedral lens 1 can be rotated.

Figure 39A:
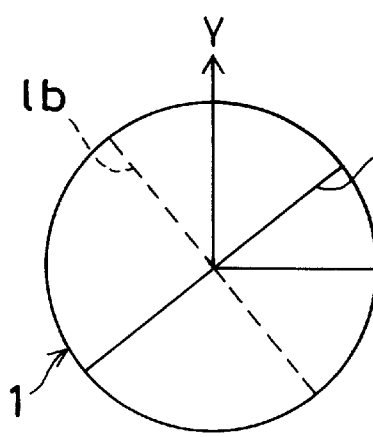
FIGS. 39A and 39B are diagrams showing the directions of boundary lines on a double-sided polyhedral lens when the ocular adapter is rotated, and also showing an operation of removing dark due to clad portions by using a spatial frequency plane.
Figure 39B:
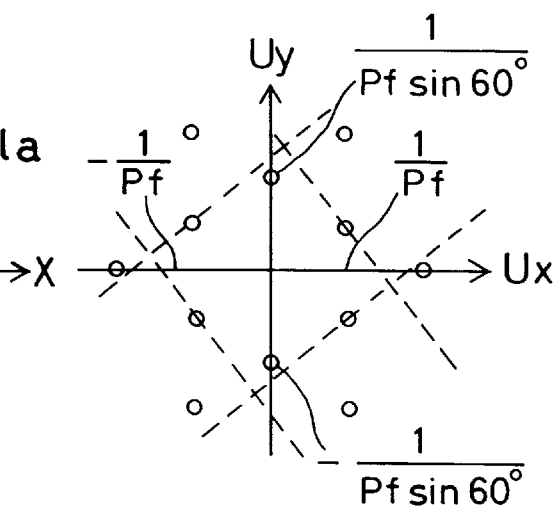

If the pin 78a is rotated through 45 degrees from a reference position shown in FIG. 35 (e.g. a position where the pin 78a projects upwardly), for example, the double-sided polyhedral lens 1 can be set to the position shown in part (a) of FIG. 37. If the pin 78a is further rotated, the double-sided polyhedral lens 1 can be set to the position shown in part (a) of FIG. 39. Even in a state where each of the boundary lines 1a and 1b intersects the X-axis at an angle other than ±45 degrees as shown in part (a) of FIG. 39, the low-pass filter function can be obtained as long as the trap lines pass in the vicinities of the frequency components (marked with circles) of the fibers.

According to this embodiment, dark due to the clad portions, which interfere with observation and degrade the image quality, can be removed by attaching the eyepiece adapter 75 to the eyepiece portion 43 of the existing fiber-scope 32. Thus, an image suitable for observation can be obtained. The polyhedral lens adapter may be attached to a TV camera or a TV adapter.

Moreover, by adjusting the amount of rotation, the double-sided polyhedral lens 1 can be set to an image condition most suitable for observation. That is, if the double-sided polyhedral lens 1 can not be rotated and is placed in a fixed-angle position (orientation), there may be cases where the double-sided polyhedral lens 1 in the position shown in part (a) of FIG. 35 cannot be set to a desired position where dark can be removed as shown in FIG. 36, or the double-sided polyhedral lens 1 in the position shown in part (a) of FIG. 37 cannot be set to a desired position where dark can be removed as shown in part (b) of FIG. 37. Even in such cases, the double-sided polyhedral lens 1 can be set to a position where an image most favorable for observation can be obtained by adjusting the amount of rotation.

Incidentally, to apply the double-sided polyhedral lens 1, 51, or 71, which has a polyhedral lens provided on each side thereof, to all image pickup optical systems, it is necessary to take care that the refracting actions of the surfaces on both sides do not cancel each other in a case where the angle $\psi$ formed between the boundary lines on the two sides is $\psi \leq 30°$.

That is, it is necessary to satisfy the following condition:

$$\psi \leq 30° \text{ at the same time } \theta a - \theta b \neq 0 \tag{25}$$

Figure 40:
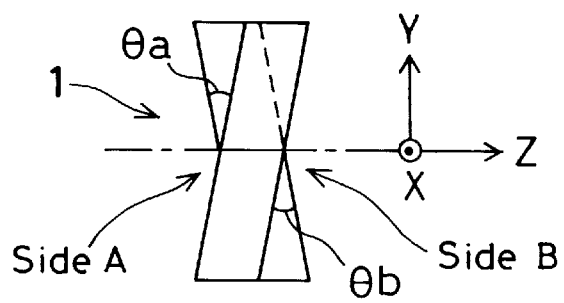
FIG. 40 is a diagram showing that the filter function is disabled when the angle formed between the boundary lines of a double-sided polyhedral lens satisfies a specific condition.

If $\psi=0$ and, at the same time, $\theta a-\theta b=0$, when the difference $\psi$ between the directions of refraction of one light beam at the sides A and B is $\psi \leq 30°$, as shown in FIG. 40, the angles $\theta a$ and $\theta b$ undesirably cancel each other at the two sides.

When $\psi \leq 30°$, the angles $\theta a$ and $\theta b$ can be selected almost freely. It should be noted that the low-pass filter function may be made variable by arranging the single-sided polyhedral lens 2 or the double-sided polyhedral lens 1 such that the amount of decentration relative to the ray bundle is variable.

Figure 41A:
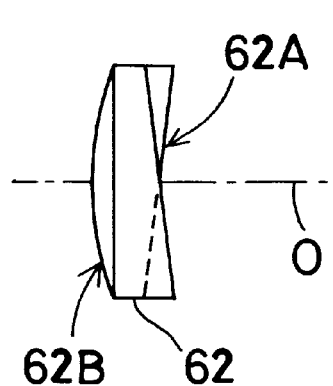
FIGS. 41A and 41B are diagrams showing an optical element having both a lens function and a filter function in a fifth embodiment of the prior application.
Figure 41B:
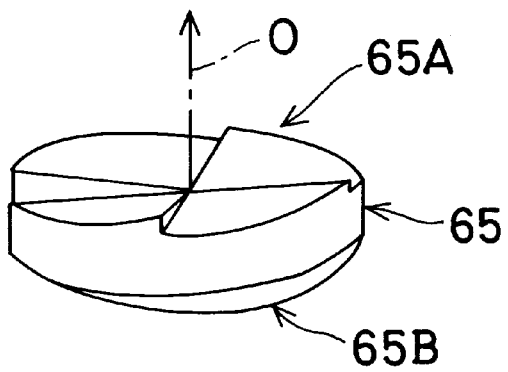

Part (a) of FIG. 41 shows an optical element 62 in a fifth embodiment of the prior application which has both an optical low-pass filter function and an image-forming function. The optical element 62 has one surface thereof formed into a polyhedral lens 62A to have a low-pass filter function. The other surface of the optical element 62 is formed into an ordinary convex lens 62B or other lens to have an image-forming function.

It is also possible to employ a polyhedral lens configuration as shown in part (b) of FIG. 41, which has advantageous effects similar to those of the double-sided polyhedral lens 1. That is, a polyhedral lens 65 shown in part (b) of FIG. 41 has a polyhedral lens surface 65A on one side thereof. The polyhedral lens surface 65A has four split surfaces which are skewed in the shape of the blades of a fan to form a polyhedral lens. The polyhedral lens 65 has an ordinary convex lens 65B on the other side.

By providing an optical element with both an optical low-pass filter function and a lens function as described above, it becomes unnecessary to provide another lens and it is possible to eliminate time and labor which would otherwise be needed to assemble separate optical parts and to adjust them. Consequently, the costs can be reduced to a considerable extent. It is also possible to minimize variations in products and to make the optical element even more compact. The optical element 62 can be used, for example, in the ocular lens 50 or the pickup lens 53. Although the number of split surfaces of the polyhedral lens 65 is four, it may be 3, 5 or any desired number.

Figure 42:
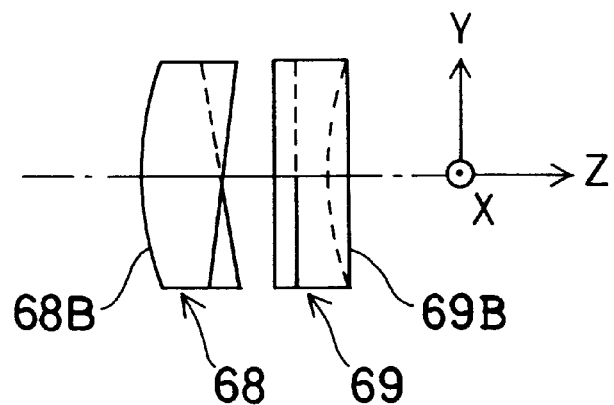
FIG. 42 is a diagram showing an optical system in a sixth embodiment of the prior application.

FIG. 42 shows an example of an optical system according to a sixth embodiment of the prior application in which two polyhedral lenses 68 and 69 are disposed such that the directions in which MTF reduces are varied from each other. For example, the polyhedral lenses 68 and 69 may be used in place of the double-sided polyhedral lens 51 and the pickup lens 53 in FIG. 30. The polyhedral lenses 68 and 69 have polyhedral lens surfaces 68A and 69A formed on one side of each of them and ordinary lens surfaces 68B and 69B on the other sides thereof. The optical system in which two single-sided polyhedral lenses are disposed as described above can exhibit almost the same function as that of the double-sided polyhedral lens 1 in the first embodiment shown in FIG. 16, and is superior in that it can be formed by machining more easily than in the case of forming polyhedral lenses on both sides of an optical element.

Moreover, by forming the ordinary lens surfaces 68B and 69B on the other sides, it is possible to eliminate the need to provide separate lens elements. It is also possible to form an optical system by placing three or more single-sided polyhedral lenses in a line, or to form an optical system by combining together one double-sided polyhedral lens and one or more single-sided polyhedral lenses. It is also possible to form an optical system by combining together one single-sided polyhedral lens and one or more double-sided polyhedral lenses.

Figure 43A:
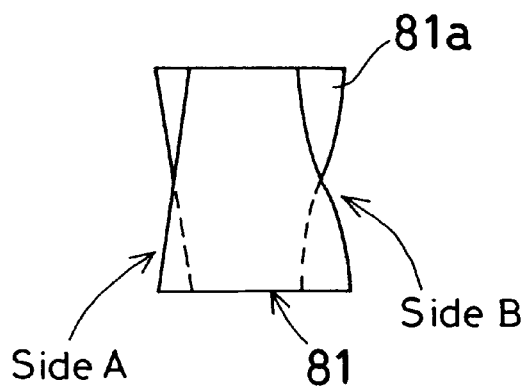
FIGS. 43A and 43B are diagrams showing an optical element in a modification of the sixth embodiment of the prior application.
Figure 43B:
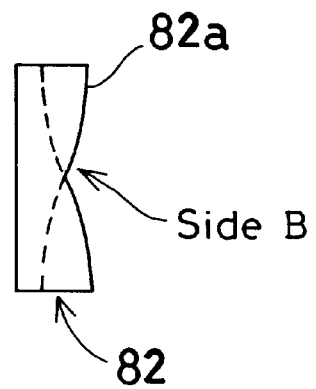

As in a modification shown in part (a) of FIG. 43, the polyhedral lens-side split surfaces on at least one side of the double-sided polyhedral lens 1 may be formed into aspherical surfaces 81a to construct a double-sided polyhedral lens 81, thereby controlling MTF. By doing so, the low-pass filter function can be changed as desired.

Regarding the single-sided polyhedral lens 2 shown in FIG. 17, the split surfaces (two slant surfaces) may be formed into aspherical surfaces 82a as shown in part (b) of FIG. 43 to control MTF or low-pass filter function. Alternatively, this technique may be used to remove dark due to the clad portions of fibers in a fiber-scope which would otherwise appear conspicuously. Although machining for the formation is difficult, because the surface on one side may be a spherical or aspherical surface, the degree of freedom of designing an optical system increases and a high-performance optical system can be obtained. In this example also, at least one of the conditions (15), (16), (19), (20) and (21) can be applied, and the above-described advantageous effects can be obtained. If the polyhedral lens shown in part (b) of FIG. 43 is combined with a camera with an auto-iris, the low-pass filter function can be changed with the change in the stop diameter, which is very convenient.

FIG. 44 shows a double-sided polyhedral lens 85 according to a seventh embodiment of the prior application. The double-sided polyhedral lens 85 is an example in which the boundary lines 1a and 1b on both sides lie at a plurality of positions away from the optical axis as viewed from the −Z direction. When thick, the bundle of light rays is split into three, and three split images are formed, but a thin bundle of rays is not split. Therefore, in an optical system whose stop diameter is variable or in a combination of optical systems, the double-sided polyhedral lens 85 advantageously enables the low-pass filter function to be changed according to the stop diameter. It should be noted that the surface on one side of the double-sided polyhedral lens 85 may be divided into three or more surface portions.

FIG. 45 shows an example of a polyhedral lens 86 in which the sectional configuration in a direction perpendicular to the surface dividing boundary line 1 is aspherical. Although in the modification shown in FIG. 17 only a pair of parallel trap lines of MTF can be obtained, this embodiment enables MTF to be reduced also in a direction parallel to the boundary line 1 as shown in part (d) of FIG. 45. That is, parts (a), (b) and (c) of FIG. 45 show a single-sided polyhedral lens 86 in an eighth embodiment of the prior application. In the polyhedral lens 86 shown in parts (a), (b) and (c) of FIG. 45, an aspherical surface configuration is used to increase the number of trap lines, thus realizing spatial frequency characteristics as shown in part (d) of FIG. 45. In this embodiment, the polyhedral lens 86 has the function of splitting an image into a plurality of images substantially at the aspherical portion. Therefore, the aspherical surface may be, for example, one that has an inflection point, and it is also possible to employ an aspherical surface with a multiplicity of optical axes as shown in part (a) of FIG. 46, or angular aspherical surfaces as shown in parts (b) and (c) of FIG. 46.

FIG. 47 shows a single-sided polyhedral lens 92 in a ninth embodiment of the prior application. The single-sided polyhedral lens 92 is an example that has four split surfaces. The single-sided polyhedral lens 92 differs from those shown in FIG. 17 and part (b) of FIG. 41 in that no step is produced at the boundaries. In this embodiment also, it is desirable to satisfy at least one of the conditions (15), (16), (20) and (21). Of the four split surfaces of the single-sided polyhedral lens 92, each pair of surfaces which are not adjacent to each other are in a skew relation to each other like the blades of a propeller.

FIG. 48 shows a single-sided polyhedral lens 94 in a modification which has split surfaces 94a which are approximately parallel to each other. MTF can be controlled by selecting a normal direction for each of the surfaces 94a. In this modification also, it is desirable to satisfy at least one of the conditions (15), (16), (19), (20) and (21). In a case where the polyhedral lens 94 as shown in FIG. 48 is produced by plastic or glass molding process, it is desirable for the split surfaces to have a configuration as shown in part (b) of FIG. 48 from the viewpoint of facilitating the mold making process and preventing a mold grinding wheel from touching a ground surface.

In the above discussion of low-pass filters, light is handled in a geometrical-optical manner. However, in either of the examples shown in FIGS. 16 and 26, the height difference between the split surfaces is of the order of from 1 micrometer to several micrometers. In such a case, wave-optical examination is needed. That is, polyhedral lenses have a phase filter effect in addition to the MTF of a wedge-shaped prism. For example, FIG. 49 shows the optical path length Lo when the double-sided polyhedral lens 1 in the embodiment shown in FIG. 16 is seen in the Z direction. The straight lines show contour lines of the optical path length Lo, which is given by $$Lo = Tz(n-1)/\lambda c \tag{26}$$

where Tz is the thickness of the double-sided polyhedral lens 1 in the Z direction, which is a function of X and Y; n is the refractive index of the double-sided polyhedral lens 1; and $\lambda c$ is a working wavelength or a mean thereof.

Specifically, Tz is as follows:

When $X \geq 0$ and $Y \geq 0$, $Tz = (-Y+X)P + T_0$

When $X \geq 0$ and $Y < 0$, $Tz = (-Y-X)P + T_0$

When $X < 0$ and $Y \geq 0$, $Tz = (Y+X)P + T_0$

When $X < 0$ and $Y < 0$, $Tz = (Y-X)P + T_0$

In the above expressions, $T_0 = 1$ millimeter; $T_0$ represents the thickness of the double-sided polyhedral lens 1 when $X = Y = 0$.

Wave-optical MTF $R(Ux', Uy')$ in this case is given approximately by $$H(X,Y) = A(X,Y)\exp[2\pi i Lo(X,Y)] \tag{27}$$

The pupil function is defined by $H(X,Y)$. $A(X,Y)$ is the amplitude transmittance of the pupil. Using the pupil function $H(X,Y)$, $$R(Ux', Uy') = (1/C) \int \int H(X,Y) H^*(X-Xo, Y-Yo) dX dY \tag{28}$$

In the above expression, the integration is performed over the whole pupil, and * represents the complex conjugate of $H(X,Y)$. Further, C is a constant for standardization.

$$Xo = \lambda c Ux'/S, \quad Yo = \lambda c Uy'/S \tag{29}$$

where S is the distance from the surface of the polyhedral lens that has a low-pass filter function to an intermediate image formed by light passing through that surface [i.e. an image formed on the assumption that there is no lens system behind (on the exit side) of the polyhedral lens]; and Ux' and Uy' represent spatial frequencies in the intermediate image.

Assuming that Pf is the fiber pitch in the fiber bundle image of the intermediate image, if Tz(X,Y) is selected so that the following conditions (30) and (31) are satisfied in place of the conditions (12), (22) and (23), moire fringes appearing in a combination with a fiber-scope can be reduced to 50% or less:

$$0<R(Ux',Uy')<0.5 \tag{30}$$

$$\sqrt{(Ux'\cdot Ux'+Uy'\cdot Uy')}=1/(Pf\sin 60°) \tag{31}$$

It should be noted that $\sqrt{}$ on the left-hand side of the condition (31) expresses the square root.

It is not necessary to satisfy the condition (30) with respect to all Ux' and Uy' that satisfy the condition (31), but the condition (30) is only necessary to satisfy with respect to Ux' and Uy' satisfying the condition (31) in the vicinity of the fundamental spatial frequency spectra of the fiber bundle image. The error in production of fibers alone is about several % and the magnification error of the lens is several %. Therefore, considering these errors, a range defined by the fundamental spatial frequency of the fiber bundle image ± about 10% is the vicinity of the fundamental spatial frequency spectra.

Similarly, the following condition (32) should preferably be satisfied in place of the condition (3):

$$0<R(1/PxM,Uy')<0.5 \tag{32}$$

where Px' is the image size of one pixel of the solid-state image pickup device 8 in the X direction at the position of the above-described intermediate image.

Similarly, the following condition (33) should preferably be satisfied in place of the condition (5):

$$0<R(40\cdot3.58/Wy',Uy')<0.5 \tag{33}$$

where Wy' is the vertical dimension of the effective portion of the solid-state image pickup device 8 in terms of the measure at the position of the intermediate image.

Similarly, the following condition (34) should preferably be satisfied in place of the condition (9):

$$0<R(1920/Wx',Uy')<0.5 \tag{34}$$

where Wx' is the horizontal dimension of the effective portion of the solid-state image pickup device 8 in terms of the measure at the position of the intermediate image.

Similarly, the following condition (35) should preferably be satisfied in place of the condition (10):

$$0<R(960/Wx',Uy')<0.5 \tag{35}$$

When the number of pixels in the horizontal direction is insufficient, the first argument of R in the condition (34) or (35) should be multiplied by npx/1920.

Let us examine the functional form of the optical path length Lo(X,Y). It is preferable that no astigmatism should occur on the optical axis. To prevent the occurrence of astigmatism, Lo(X,Y) should coincide with Lo(X,Y) when it is rotated through 360°/nr around the Z-axis, where nr is a natural number and $$nr \geq 3 \tag{36}$$

The double-sided polyhedral lens 1 is an example in which nr=4.

Thus, even more diverse low-pass filter performance can be elicited by handling polyhedral lenses in a wave-optical manner as stated above.

Examples 1 and 2 of the image-forming optical apparatus according to the present invention will be described below. Constituent parameters of each example will be described later. In the constituent parameters in each example, as shown in FIG. 1, one plane (the plane of a stop 101 in the case of FIG. 1) specified as a reference plane of an optical system is defined as the origin of a decentration plane, and an axial principal ray 102 is defined by a light ray emanating from the center of an object (not shown) and passing through the center of the stop 101. A Z-axis is taken in a direction in which the light ray from the object center travels along the axial principal ray 102 until it reaches the first surface of the optical system. A plane containing both the Z-axis and the center of an image plane 108 is defined as a YZ-plane. A Y-axis is taken in a direction perpendicularly intersecting the Z-axis in the YZ-plane. A direction in which the Z-axis extends from the object point to the first surface of the optical system is defined as a positive direction of the Z-axis. The upward direction of the Y-axis as viewed in the figure (i.e. a direction in which light rays are reflected by a first reflecting surface 106) is defined as a positive direction of the Y-axis. An axis which constitutes a right-handed orthogonal coordinate system in combination with the Y- and Z-axes is defined as an X-axis.

In Examples 1 and 2, each surface is decentered in the YZ-plane, and the only one plane of symmetry of each rotationally asymmetric free-form surface is the YZ-plane.

Regarding decentered surfaces, each surface is given displacements (x, y and z, respectively) in the X-, Y- and Z-axis directions of the vertex position of the surface from the origin of the optical system and tilt angles of the center axis of the surface [the Z-axis of the above equation (a) in regard to free-form surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical systems according to Examples 1 and 2, each pair of adjacent surfaces which form a coaxial system is given a surface separation. In addition, the refractive index of each medium, together with Abbe's number, is given according to the conventional method.

The surface configuration of each free-form surface is defined by the above equation (a). The Z-axis of the defining equation (a) is the axis of a free-form surface.

It should be noted that terms concerning aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (b). The Z-axis of the defining equation (b) is the axis of the Zernike polynomial.

X=R×cos(A)

Y=R×sin(A)

$$Z = D_2 + \tag{b}$$

-continued $$D_3 R \cos(A) + D_4 R \sin(A) +$$
$$D_5 R^2 \cos(2A) + D_6 (R^2 - 1) + D_7 R^2 \sin(2A) +$$
$$D_8 R^3 \cos(3A) + D_9 (3R^3 - 2R) \cos(A) +$$
$$D_{10}(3R^3 - 2R)\sin(A) + D_{11} R^3 \sin(3A) +$$
$$D_{12} R^4 \cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4 \sin(4A) + D_{17} R^5 \cos(5A) +$$
$$D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5 \sin(5A) +$$
$$D_{23} R^6 \cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6 \sin(6A) \ldots$$

Figure 2:
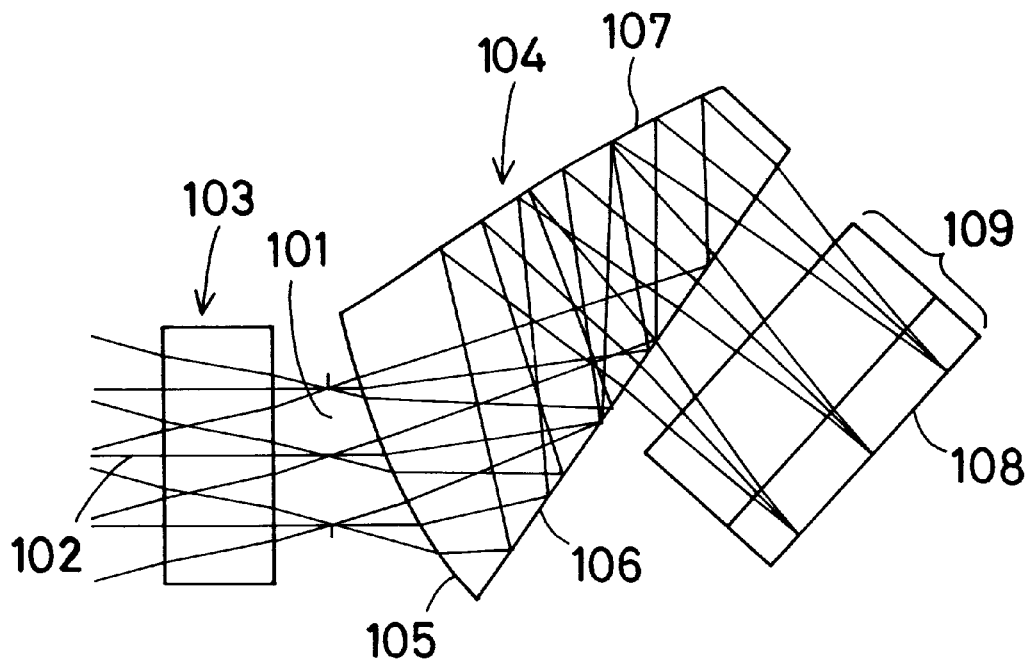
FIG. 2 is a sectional view of an image-forming optical apparatus according to Example 2 of the present invention.

Examples 1 and 2 will be described below. FIGS. 1 and 2 are sectional views of Examples 1 and 2, taken along the YZ-plane containing the axial principal ray 102. In each figure, reference numeral 101 denotes a stop; 102 denotes an axial principal ray; 103 denotes a low-pass filter; 104 denotes a decentered prism optical system constituting an objective optical system; 105 denotes a first surface of the decentered prism optical system 104; 106 denotes a second surface of the decentered prism optical system 104; 107 denotes a third surface of the decentered prism optical system 104; 108 denotes an image plane where an image pickup surface of an electronic image pickup device, e.g. a CCD, is disposed; and 109 denotes a filter unit including an infrared cutoff filter, a cover glass, etc. The optical system according to these examples uses three rotationally asymmetric free-form surfaces each having one plane of symmetry. The optical system has, in order from the object side thereof, a stop 101, a first transmitting surface 105, a first reflecting surface 106, a second reflecting surface 107, and a second transmitting surface 106. The first reflecting surface and the second transmitting surface are formed from the identical surface 106, and the first reflecting surface utilizes total reflection. Therefore, the optical system comprises as small a number of surfaces as three.

Light rays emanating from an object (not shown) pass through the low-pass filter 103, which is disposed in the vicinity of the stop 101 on the object side thereof, and further pass through the aperture of the stop 101 to enter the decentered prism optical system 104 through the first surface 105 thereof. The light rays are reflected by the second surface 106 and then reflected by the third surface 107. The reflected light rays come out of the decentered prism optical system 104 through the second surface 106 and pass through the filter unit 109 to form an object image on the image plane 108.

In these examples, the stop 101 and the low-pass filter 103, which also serves as a protective glass, are provided on the object side of the decentered prism optical system 104 including decentered rotationally asymmetric reflecting surfaces. As the low-pass filter 103, a low-pass filter such as a polyhedral lens described in JP(A) 7-325269 is used. The space can be efficiently utilized by adding various functions such as the function of controlling the light quantity, for example, by disposing a wavelength selecting or ND filter in front of the stop 101.

In the decentered prism optical system 104 according to the present invention, which is arranged as shown in FIG. 1, the low-pass filter 103 is disposed in the vicinity of the stop 101 on the object side of the decentered prism optical system 104 because there are cases where it is difficult to ensure a sufficient back focus. As the low-pass filter 103, it is desirable to use a low-pass filter proposed in JP(A) 7-325269, which forms a double image by pupil division and which is less costly and effective even under defocus conditions. It is also possible to use a low-pass filter having a plane surface at one side thereof and an angular surface at the other side thereof, as disclosed in JP(A) 3-248695. It is also possible to use a known low-pass filter, e.g. a crystal low-pass filter. Regarding the position of a low-pass filter that forms a double image by pupil division, it is desirable from the viewpoint of minimizing the size of the low-pass filter and minimizing the unevenness of low-pass effect at the image plane to place the low-pass filter at a position apart from the pupil (stop 101) position by a distance not more than f/2, where f is the focal length of the decentered prism optical system 104.

The specifications of Example 1 are as follows: The horizontal half field angle is 21.32 degrees; the vertical half field angle is 16.31 degrees; the entrance pupil diameter is 1.785 millimeters; and the image size is 3.83×2.93 millimeters. The specifications of Example 2 are as follows: The horizontal half field angle is 21.32 degrees; the vertical half field angle is 16.31 degrees; the entrance pupil diameter is 1.785 millimeters; and the image size is 3.90×2.89 millimeters. It should be noted that, in Examples 1 and 2, the image size is optimized on the assumption that the system uses an image pickup device of ¼ inch size which has an image field size of about 4×3 millimeters, and that the optical system according to each example can be applied to other sizes by coefficient-multiplying the entire optical system.

The constituent parameters will be shown later. Displacements of each surface are expressed by amounts of displacement from the surface No. 3. The surface No. 8 is a hypothetic plane. The surface Nos. 9 and higher represent various optical members (filter unit 109) including an infrared cutoff filter, a cover glass, etc.

In Example 1, powers in the vicinities of points where the axial principal ray intersects each surface are, in order from the first transmitting surface, 0.183, −1.497, 2.654 and −0.275 in the decentration plane (Y) and −0.483, −1.057, 2.426 and −0.241 in the direction (X) perpendicularly intersecting the decentration plane. Thus, each transmitting surface is assigned a small power, whereas each reflecting surface is assigned a large power, thereby effectively utilizing the point at which aberrations produced by the reflecting surface become small, and reducing chromatic aberrations produced by the transmitting surface. In broad perspective, the optical system has a retrofocus type power distribution in which a negative power and a positive power are distributed in order from the object side. Further, in Example 1, the first transmitting surface is assigned a negative power or a small positive power, and the negative power of the first reflecting surface and the positive power of the second reflecting surface are made strong, thereby ensuring a long back focus in comparison to Example 2.

Figure 3:
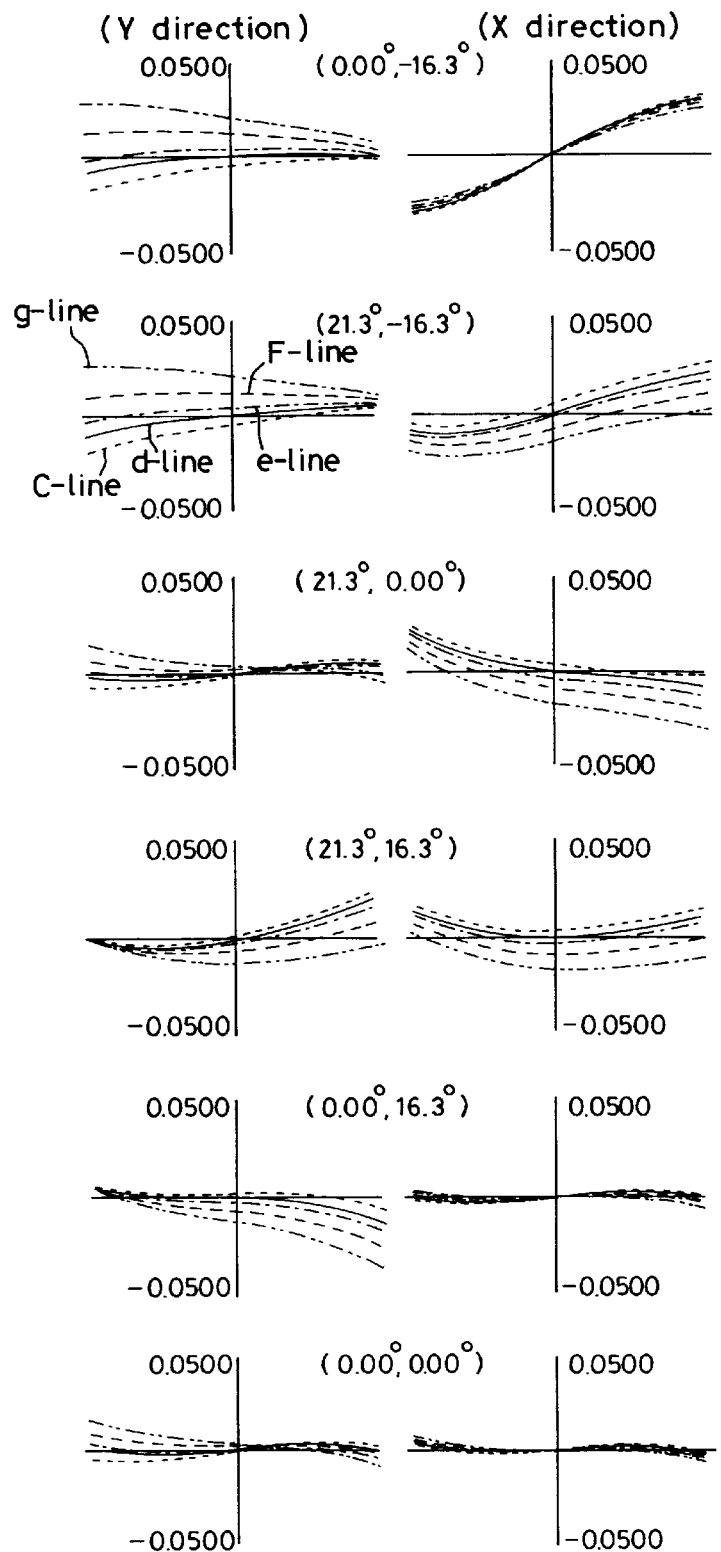
FIG. 3 is an aberrational diagram showing lateral aberrations in Example 1.
Figure 4:
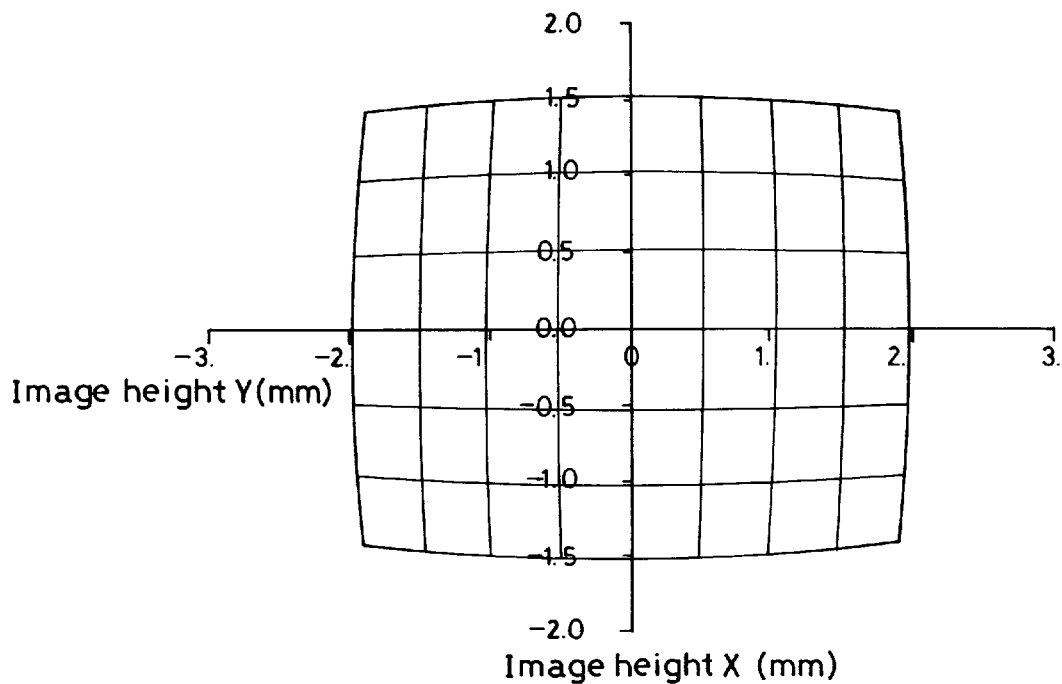
FIG. 4. is an aberrational diagram showing image distortion in Example 1.

Lateral aberrations with respect each field angle in Example 1 are graphically shown in FIG. 3, and the condition of distortion in Example 1 is shown in FIG. 4. In the aberrational diagram of FIG. 3, the parenthesized numerals denote [horizontal (X-direction) field angle, vertical (Y-direction) field angle], and lateral aberrations at the field angles are shown. As will be clear from the sectional view of FIG. 1 and the aberrational diagrams of FIGS. 3 and 4, Example 1 attains favorable optical performance with a simple arrangement comprising a single block having a small size of about 8×6×6 millimeters despite the wide horizontal field angle of 42.6 degrees.

Constituent parameters in the foregoing Examples 1 and 2 are shown below. It should be noted that each free-form surface is denoted by "FFS".

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | 1.50 | | 1.5163 | 64.2 |
| 2 | ∞ | 0.75 | | | |
| 3 | ∞(Stop)) (Reference plane) | | | | |
| 4 | FFS [1] | | (1) | 1.8061 | 40.9 |
| 5 | FFS [2] | | (2) | 1.8061 | 40.9 |
| 6 | FFS [3] | | (3) | 1.8061 | 40.9 |
| 7 | FFS [2] | | (2) | | |
| 8 | ∞ | 0.00 | (4) | | |
| 9 | ∞ | 1.00 | | 1.5163 | 64.1 |
| 10 | ∞ | 0.40 | | 1.5163 | 64.1 |
| Image plane | ∞ | | | | |

FFS [1]
$C_5$ $1.3831 \times 10^{-2}$ $C_7$ $-3.6090 \times 10^{-2}$ $C_8$ $-7.3679 \times 10^{-3}$
$C_{10}$ $1.5720 \times 10^{-3}$
FFS [2]
$C_5$ $2.5299 \times 10^{-2}$ $C_7$ $1.7622 \times 10^{-2}$ $C_8$ $-8.4559 \times 10^{-4}$
$C_{10}$ $2.4760 \times 10^{-4}$
FFS [3]
$C_5$ $-4.4848 \times 10^{-2}$ $C_7$ $-4.0459 \times 10^{-2}$ $C_8$ $5.2867 \times 10^{-4}$
$C_{10}$ $4.0114 \times 10^{-4}$ $C_{12}$ $-1.0522 \times 10^{-4}$ $C_4$ $-2.5073 \times 10^{-4}$
$C_{16}$ $-1.0204 \times 10^{-4}$ $C_{17}$ $1.2722 \times 10^{-5}$ $C_{19}$ $2.1529 \times 10^{-5}$
$C_{21}$ $4.3005 \times 10^{-6}$

| | Displacement and tilt (1) | | | | |
|---|---|---|---|---|---|
| x | 0.000 | y | 0.000 | z | 0.803 |
| α | 15.34 | β | 0.00 | γ | 0.00 |
| | Displacement and tilt (2) | | | | |
| x | 0.000 | y | 0.333 | z | 3.551 |
| α | −40.74 | β | 0.00 | γ | 0.00 |
| | Displacement and tilt (3) | | | | |
| x | 0.000 | y | 3.101 | z | 3.473 |
| α | 109.99 | β | 0.00 | γ | 0.00 |
| | Displacement and tilt (4) | | | | |
| x | 0.000 | y | −2.637 | z | 7.430 |
| α | −56.89 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ | 1.50 | | 1.5163 | 64.2 |
| 2 | ∞ | 0.75 | | | |
| 3 | ∞(Stop)) (Reference plane) | | | | |
| 4 | FFS[1] | | (1) | 1.5400 | 59.4 |
| 5 | FFS[2] | | (2) | 1.5400 | 59.4 |
| 6 | FFS[3] | | (3) | 1.5400 | 59.4 |
| 7 | FFS[2] | | (2) | | |
| 8 | ∞ | 0.00 | (4) | | |
| 9 | ∞ | 1.50 | | 1.5163 | 64.2 |
| 10 | ∞ | 0.75 | | 1.5163 | 64.2 |
| Image plane | | | | | |

FFS [1]
$C_5$ $5.5611 \times 10^{-2}$ $C_7$ $7.3954 \times 10^{-2}$ $C_8$ $-2.2062 \times 10^{-3}$
$C_{10}$ $-9.3451 \times 10^{-3}$
FFS [2]
$C_5$ $7.1877 \times 10^{-4}$ $C_7$ $1.4712 \times 10^{-2}$ $C_8$ $-3.4549 \times 10^{-4}$
$C_{10}$ $-3.3241 \times 10^{-3}$
FFS [3]
$C_5$ $2.4606 \times 10^{-2}$ $C_7$ $-3.6544 \times 10^{-2}$ $C_8$ $7.8613 \times 10^{-4}$
$C_{10}$ $-2.4000 \times 10^{-4}$ $C_{12}$ $2.2952 \times 10^{-4}$ $C_{14}$ $9.1669 \times 10^{-4}$
$C_{16}$ $1.2169 \times 10^{-4}$ $C_{17}$ $1.8425 \times 10^{-5}$ $C_{19}$ $7.3383 \times 10^{-5}$
$C_{21}$ $4.7013 \times 10^{-5}$

| | Displacement and tilt (1) | | | | |
|---|---|---|---|---|---|
| x | 0.000 | y | 0.000 | z | 0.815 |
| α | 23.06 | β | 0.00 | γ | 0.00 |
| | Displacement and tilt (2) | | | | |
| x | 0.000 | y | 0.433 | z | 3.776 |
| α | −36.70 | β | 0.00 | γ | 0.00 |
| | Displacement and tilt (3) | | | | |
| x | 0.000 | y | 3.776 | z | 3.290 |
| α | 118.34 | β | 0.00 | γ | 0.00 |
| | Displacement and tilt (4) | | | | |
| x | 0.000 | y | 1.487 | z | 5.797 |
| α | −44.31 | β | 0.00 | γ | 0.00 |

Figure 5:
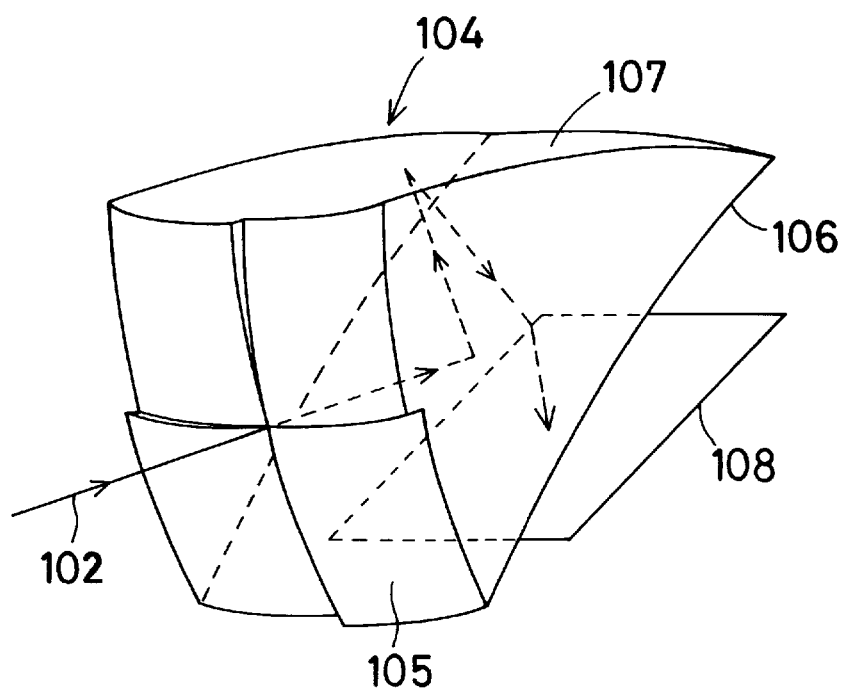
FIG. 5 is a schematic perspective view of a decentered prism optical system according to a modification of the present invention.

In the decentered prism optical system 104 as shown in FIG. 1 or 2, the pupil position may be set inside the decentered prism optical system 104, not on the object side of the first surface 105. In such a case, a transmitting or reflecting surface which is present in the vicinity of the pupil position is formed into a polyhedral configuration on the basis of the description in JP(A) 7-325269. By doing so, it is possible to obtain a low-pass function whereby moire fringes are prevented from appearing. FIG. 5 is a schematic perspective view showing the first transmitting surface 105 of the decentered prism optical system 104 as formed into a polyhedral configuration in which lines normal to a plurality of surfaces are in a skew relation with respect to the optical axis 102 and which has a low-pass function.

Figure 6:
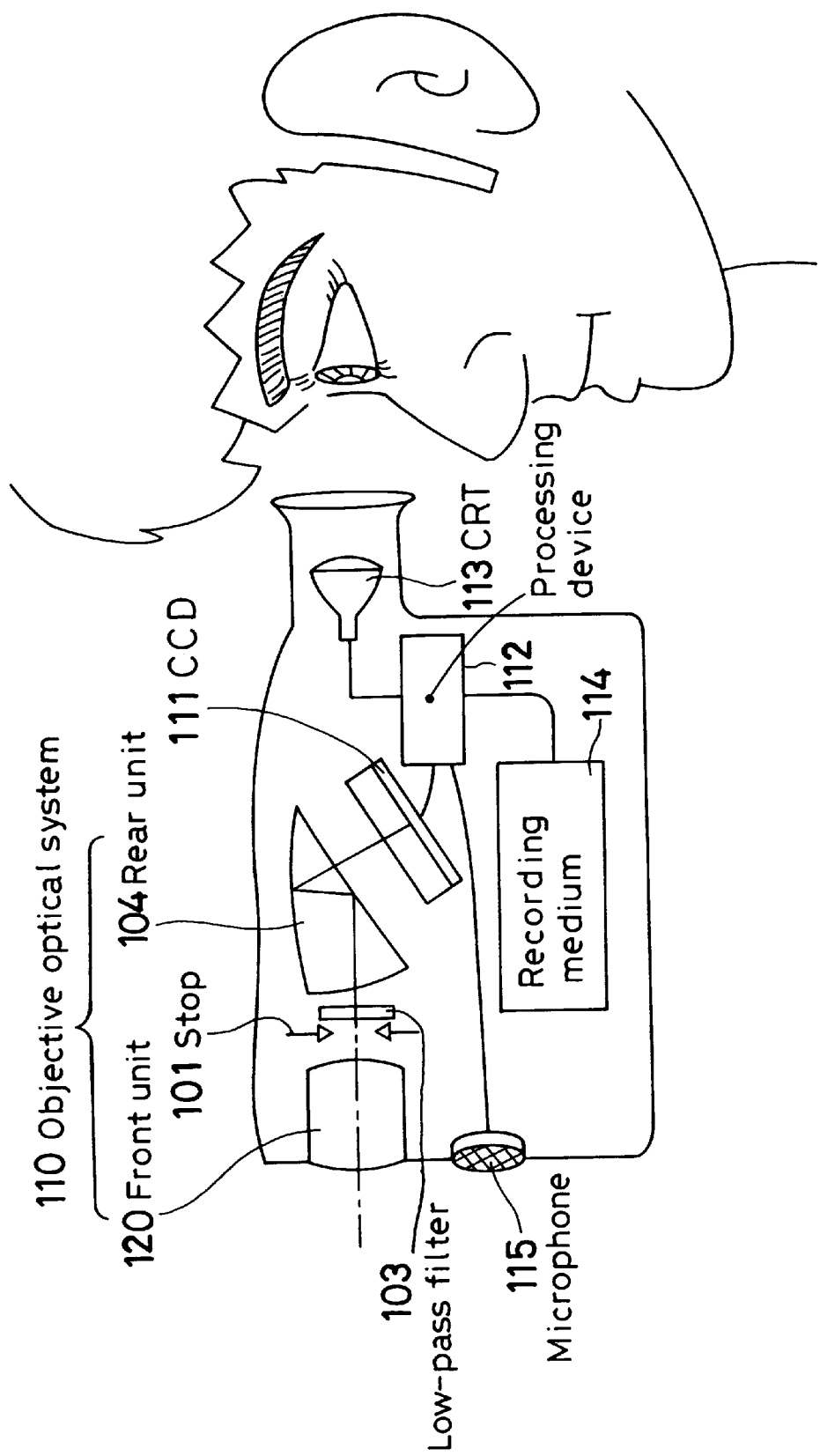
FIG. 6 is a conceptual view of an electronic camera in which an image-forming optical apparatus according to the present invention is incorporated.

An image-forming optical apparatus according to the present invention arranged as described above may be used in an image pickup apparatus such as a compact TV camera using, for example, a CCD as an image pickup device. FIG. 6 is a conceptual view showing an arrangement in which an image-forming optical apparatus according to the present invention is incorporated into an image pickup apparatus using a CCD 111 as an electronic image pickup device. In this case, an objective optical system 110 has a decentered prism optical system 104 used as a rear unit disposed on the image side of a stop 101. A front unit 120 including a refracting optical system is disposed on the object side of the stop 101. An object image is formed on the CCD 111 disposed in the image plane through the front unit 120, the low-pass filter 103 and the rear unit 104. The object image is converted into an image signal by the CCD 111. The image signal is processed by a processing device 112 and displayed directly on a CRT 113 operating as an electronic finder. In addition, the image signal is recorded on a recording medium 114 contained in the image pickup apparatus. Further, the image pickup apparatus has a microphone 115 to record sound information at the same time as the image signal is recorded. The image pickup apparatus may be arranged such that the processing device 112 corrects distortion and lateral chromatic aberrations produced in the optical system 110 by using a digital image processing technique on the basis of information concerning distortion and lateral chromatic aberrations of the optical system 110 previously stored in the recording medium 114 or a memory or the like attached to the processing device 112.

The size and production cost of the image pickup apparatus can be reduced by reducing the number of constituent elements and size of the objective optical system 110 on the basis of the present invention.

Figure 7A:
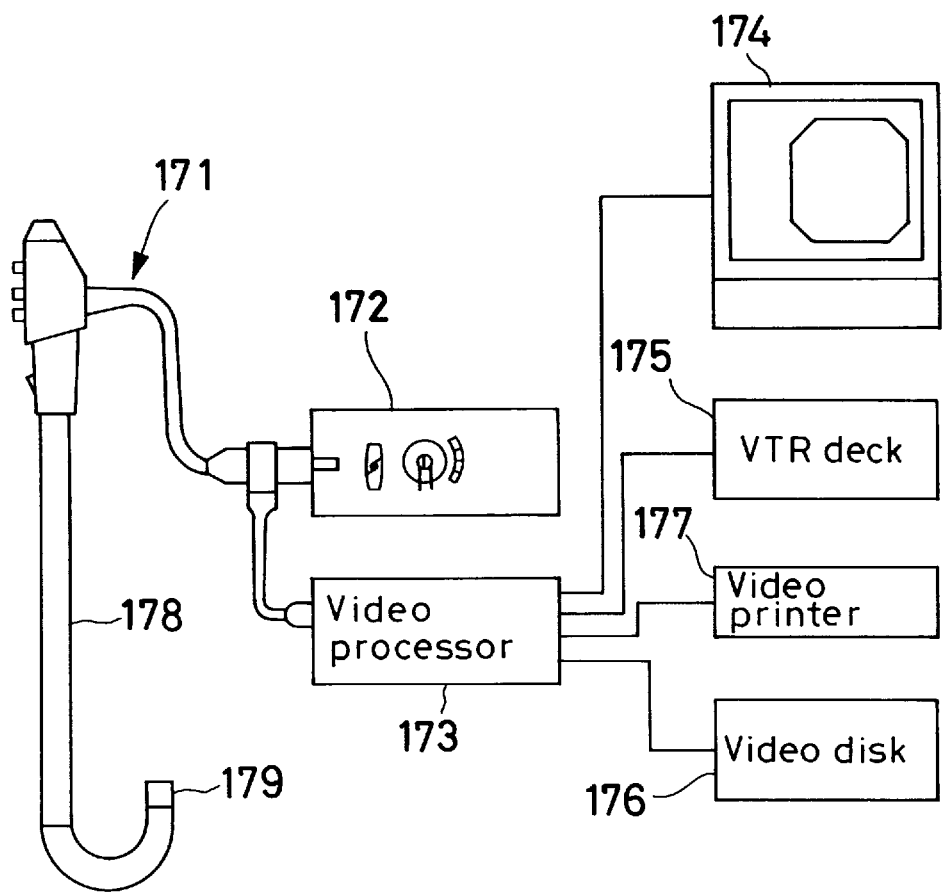
FIGS. 7A and 7B are conceptual views of a video endoscope in which an image-forming optical apparatus according to the present invention is incorporated.
Figure 7B:
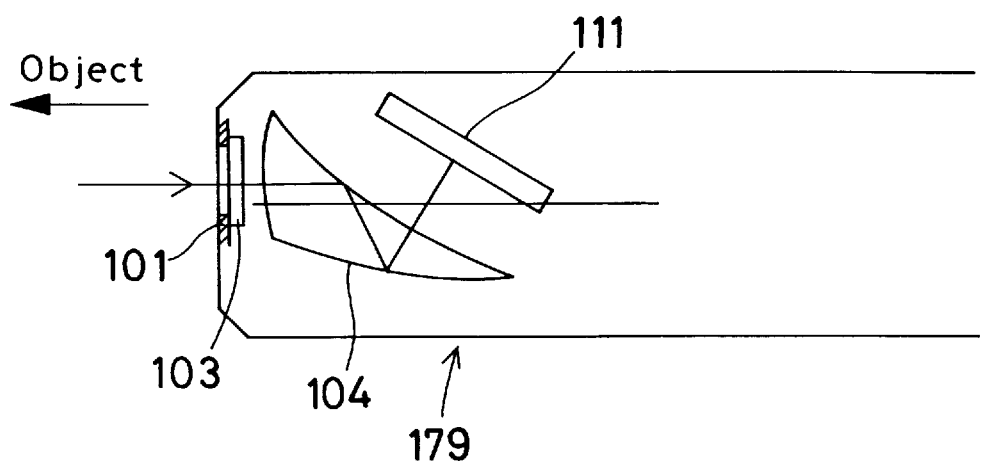

An image-forming optical apparatus according to the present invention arranged as described above may be used in a video endoscope system arranged as shown in part (a) of FIG. 7. The video endoscope system includes a video endoscope 171, a light source unit 172 for supplying illuminating light, a video processor 173 for executing processing of signals associated with the video endoscope 171, a monitor 174 for displaying video signals outputted from the video processor 173, a VTR deck 175 and a video disk 176, which are connected to the video processor 173 to record video signals and so forth, and a video printer 177 for printing out video signals in the form of images. The video endoscope 171 has an insert part 178 with a distal end portion 179. An image-forming optical apparatus according to the present invention as shown for example in part (b) of FIG. 7 is incorporated in the distal end portion 179 of the insert part 178 to form a direct-view video endoscope.

In part (b) of FIG. 7, an image pickup apparatus used in the direct-view video endoscope comprises an objective optical system consisting essentially of a decentered prism optical system 104, and a CCD 111 disposed in an image plane of the decentered prism optical system 104. A stop 101 is positioned on the object side of the decentered prism optical system 104. A low-pass filter 103 is disposed on the image side of the stop 101. An object image is formed on the CCD 111 through the low-pass filter 103 and the decentered prism optical system 104. The object image is converted into an image signal by the CCD 111. The image signal is displayed directly on the monitor 174 by the video processor 173. In addition, the image signal is recorded in the VTR deck 175 and on the video disk 176 and also printed out in the form of an image from the video printer 177.

The objective optical system according to the present invention is applicable to various other forms shown below in addition to the foregoing examples.

Figure 8:
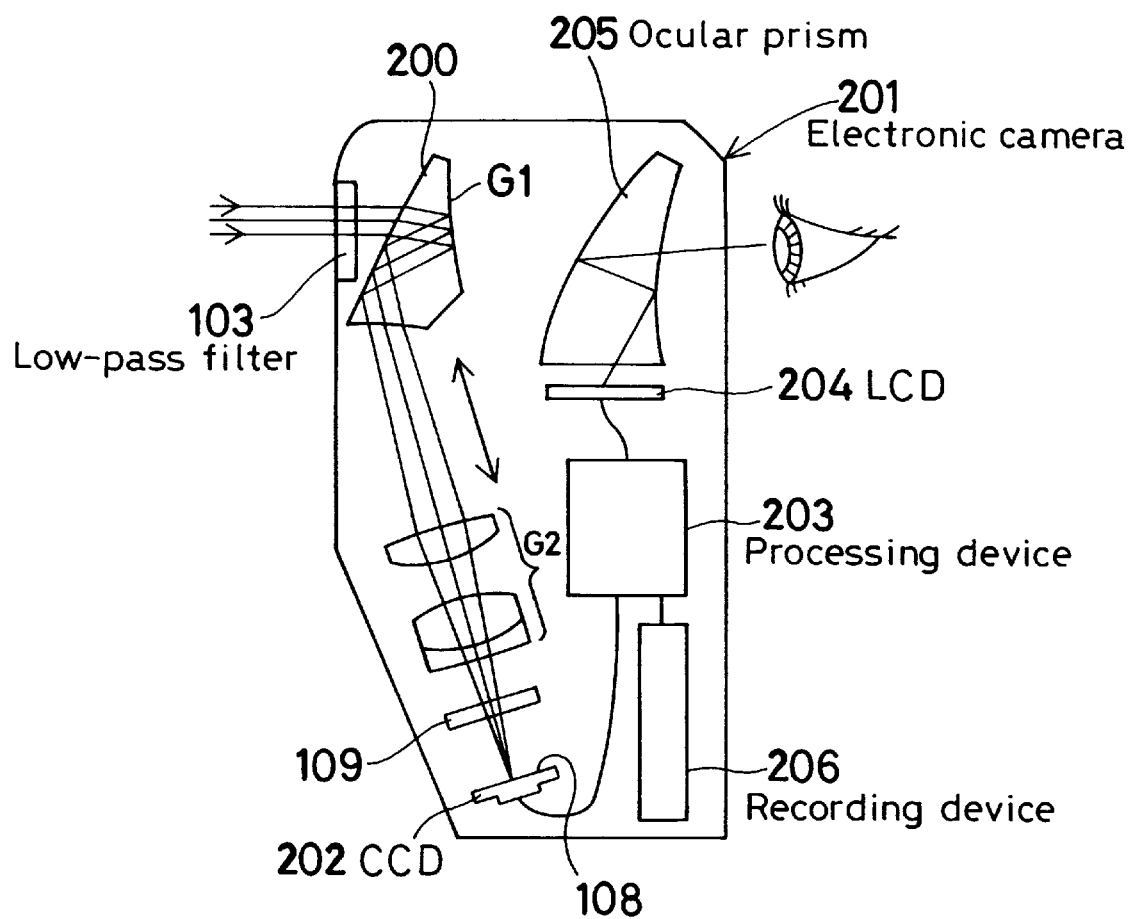
FIG. 8 is a diagram showing an example of an electronic camera in which an objective optical system according to the present invention is incorporated.

FIG. 8 shows an arrangement in which a two-unit zoom lens system is provided as an objective optical system. A first lens unit G1 comprises a decentered prism optical system 200 having a negative power as a whole. A second lens unit G2 comprises a lens system having a positive power as a whole. To effect zooming from a wide-angle end to a telephoto end, the second lens unit G2 moves toward the object side. The decentered prism optical system 200 is in inverse relation the decentered prism optical system 104 according to Example 1 (FIG. 1) in terms of the arrangement of the optical path. That is, the pupil side of the decentered prism optical system 104 is the image side of the decentered prism optical system 200, and the image side of the former is the pupil side of the latter. At least one surface of the decentered prism optical system 200 is formed from a rotationally asymmetric free-form surface having one plane of symmetry. It is desirable that all the three surfaces of the decentered prism optical system 200 should be formed from rotationally asymmetric free-form surfaces each having one plane of symmetry.

The arrangement shown in FIG. 8 is an example in which the objective optical system according to the present invention is disposed in an electronic camera 201. An object image formed on an image plane 108 of a CCD 202 is converted into an image signal. The image signal is inputted into an image signal processing device 203. The image signal processed in the processing device 203 is inputted to an LCD (Liquid Crystal Display) 204, thereby displaying the object image on the LCD 204. An enlarged image of the display image is projected into a photographer's eye through an ocular prism 205 formed from a decentered optical system. Meanwhile, the image signal is recorded in a recording device 206 connected to the processing device 203. The low-pass filter 103 and the filter unit 109, which includes an infrared cutoff filter, etc., are similar to those in Example 1.

The objective optical system shown in FIG. 8 may be a three-unit zoom lens system having a third lens unit G3 (not shown) in addition to the two lens units, or a four-unit zoom lens system having a fourth lens unit G4 (not shown) provided in addition to the three lens units.

Figure 9:
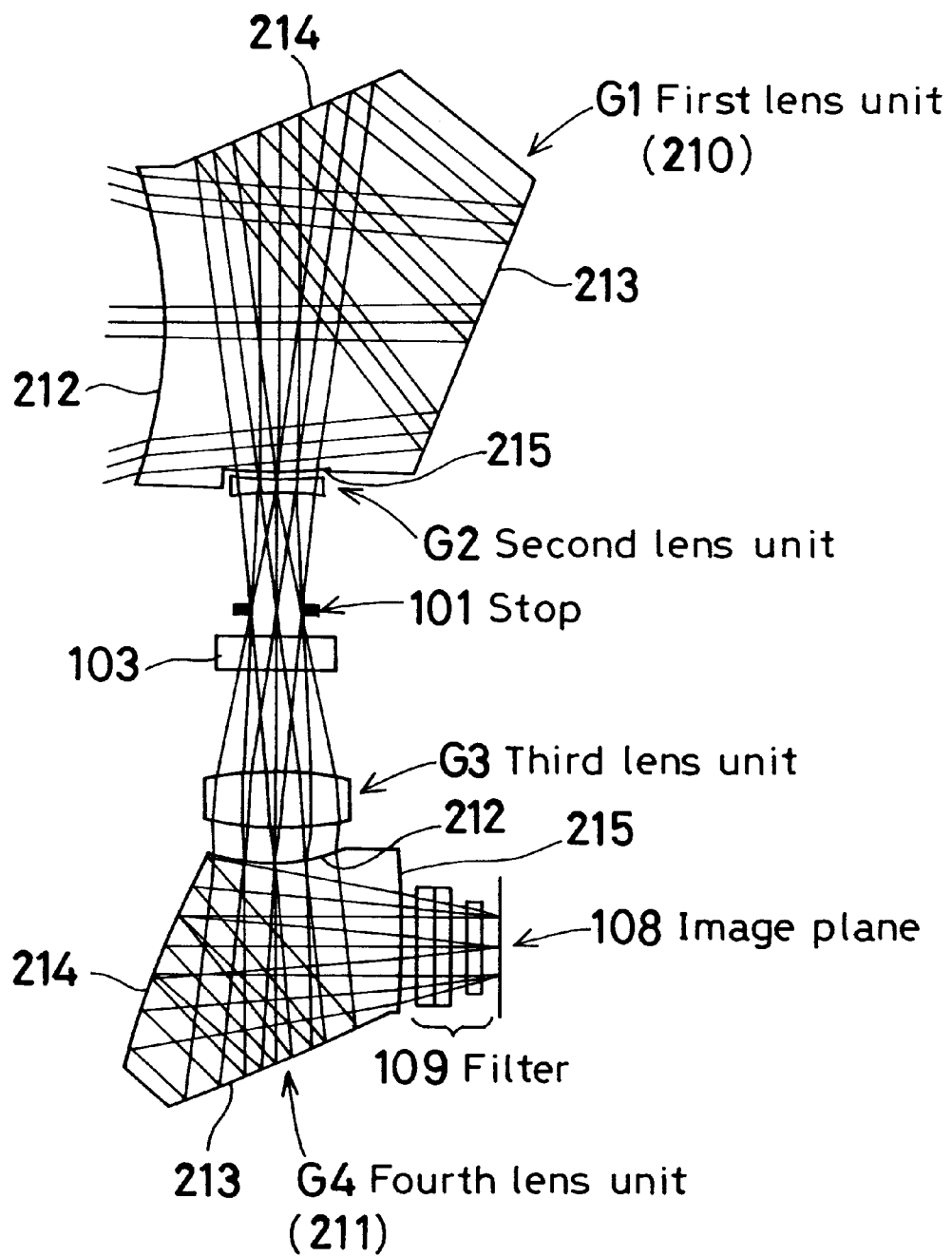
FIG. 9 is a sectional view showing an example in which a plurality of decentered prism optical systems are used in an objective optical system.

A plurality of decentered prism optical systems may be used in an objective optical system. An example of such an arrangement is shown in FIG. 9. In this example, a first lens unit G1 and a fourth lens unit G4 are formed from decentered prism optical systems 210 and 211, respectively. A second lens unit G2 and a third lens unit G3 are disposed between the first lens unit G1 and the fourth lens unit G4. The decentered prism optical systems 210 and 211 are different in configuration from the decentered prism optical systems shown in FIGS. 1 and 8. That is, light enters the decentered prism optical system 210 (211) through a first surface 212 and is reflected successively by a second surface 213 and a third surface 214 so as to exit from the decentered prism optical system 210 (211) through a fourth surface 215. In each of the decentered prism optical systems 210 and 211, at least one surface, desirably every surface, is formed from a rotationally asymmetric free-form surface having one plane of symmetry. The low-pass filter 103 is disposed in the vicinity of a pupil closer to the object than the reflecting surface 213 of the decentered prism optical system 211. An aperture stop 101 is provided in the pupil plane.

The decentered prism optical system may also be formed as shown in FIGS. 10 to 15. In these decentered prism optical systems, at least one surface, desirably every surface, is formed from a rotationally asymmetric free-form surface having one plane of symmetry.

Figure 10:
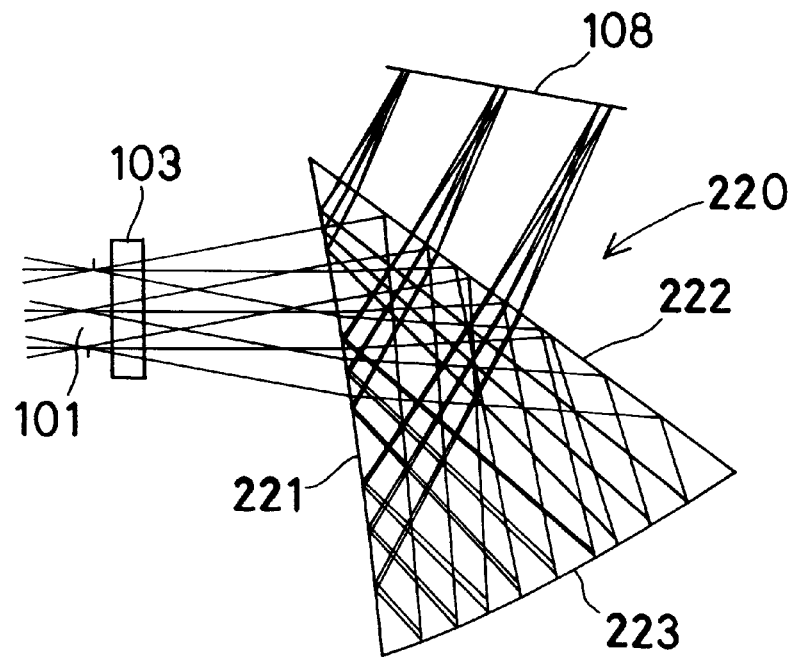
FIG. 10 is a sectional view showing a modification of the decentered prism optical system.

A decentered prism optical system 220 shown in FIG. 10 is arranged such that light enters it through a first surface 221 and is reflected successively by a second surface 222, a third surface 223 and the first surface 221 so as to exit from the optical system 220 through the second surface 222.

Figure 11:
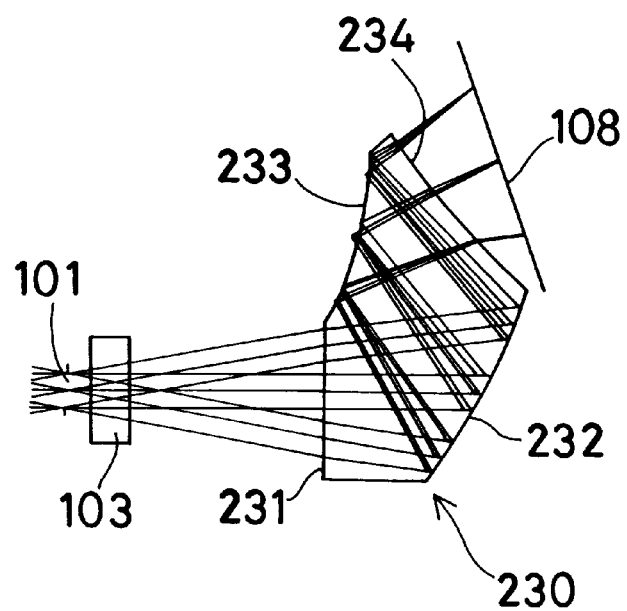
FIG. 11 is a sectional view showing another modification of the decentered prism optical system.

A decentered prism optical system 230 shown in FIG. 11 is arranged such that light enters it through a first surface 231 and is reflected successively by a second surface 232 and a third surface 233 so as to exit from the optical system 230 through a fourth surface 234.

Figure 12:
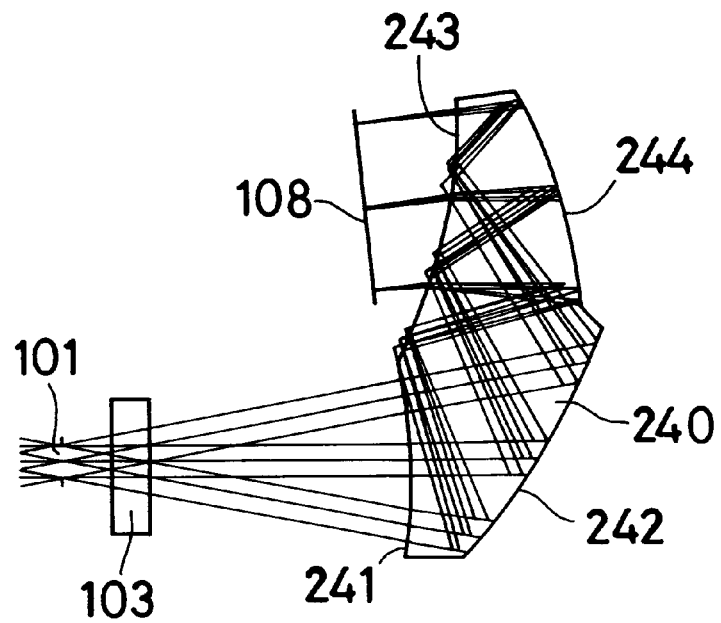
FIG. 12 is a sectional view showing still another modification of the decentered prism optical system.

A decentered prism optical system 240 shown in FIG. 12 is arranged such that light enters it through a first surface 241 and is reflected successively by a second surface 242, a third surface 243 and a fourth surface 244 so as to exit from the optical system 240 through the third surface 243.

Figure 13:
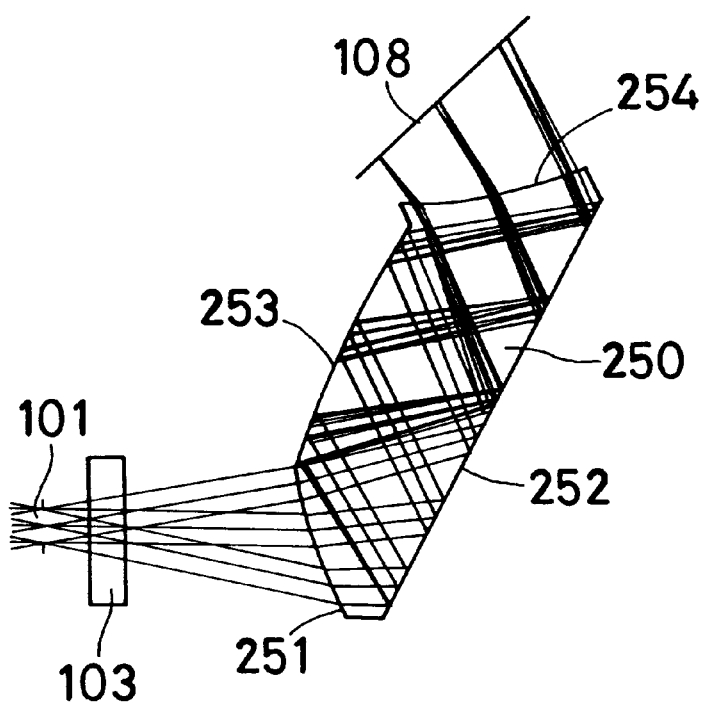
FIG. 13 is a sectional view showing still another modification of the decentered prism optical system.

A decentered prism optical system 250 shown in FIG. 13 is arranged such that light enters it through a first surface 251 and is reflected successively by a second surface 252, a third surface 253 and the second surface 252 so as to exit from the optical system 250 through a fourth surface 254.

Figure 14:
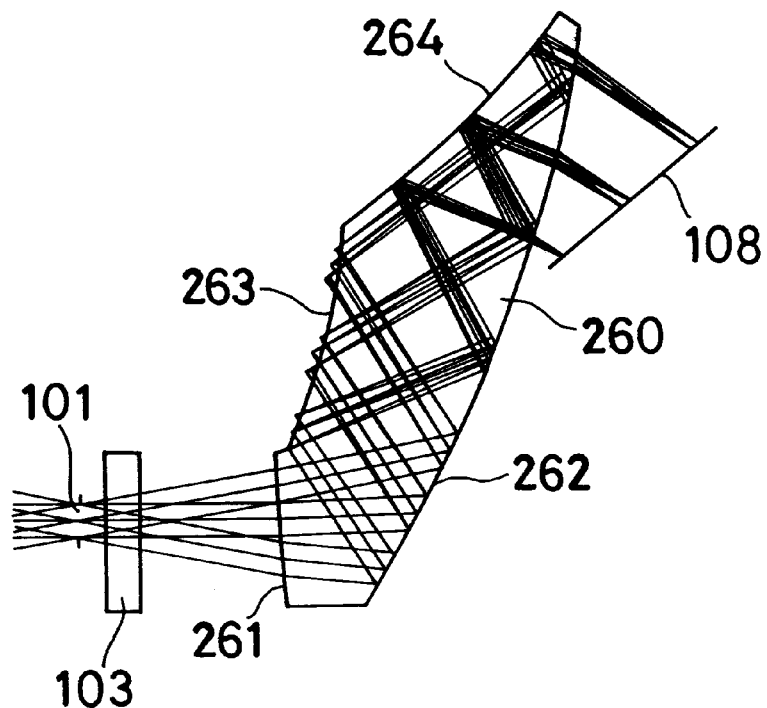
FIG. 14 is a sectional view showing still another modification of the decentered prism optical system.

A decentered prism optical system 260 shown in FIG. 14 is arranged such that light enters it through a first surface 261 and is reflected successively by a second surface 262, a third surface 263, the second surface 262 and a fourth surface 264 so as to exit from the optical system 260 through the second surface 262.

Figure 15:
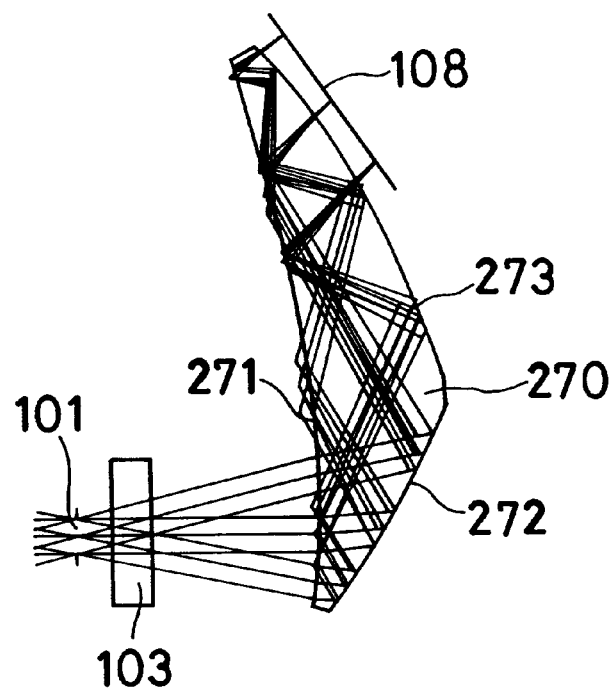
FIG. 15 is a sectional view showing still another modification of the decentered prism optical system.

A decentered prism optical system 270 shown in FIG. 15 is arranged such that light enters it through a first surface 271 and is reflected successively by a second surface 272, the first surface 271, a third surface 273 and the first surface 271 so as to exit from the optical system 270 through the third surface 273.

As will be clear from the foregoing description, it is possible according to the present invention to obtain a compact image-forming optical apparatus which is free from moire fringes and capable of providing an aberration-free, clear image of minimal distortion even at a wide field angle.

What we claim is:

1. In an image-forming optical apparatus comprising an objective optical system and an electronic image pickup device which is disposed in a plane where an image of an object is formed by said objective optical system, the improvement wherein said objective optical system has at least one reflecting surface decentered such that a whole of said surface is tilted with respect to an axial principal ray defined by a light ray emanating from a center of the object and passing through a center of a pupil to reach a center of the object image, said reflecting surface having a rotationally asymmetric surface configuration that corrects rotationally asymmetric decentration aberrations caused by decentration, and wherein a low-pass member is disposed in a vicinity of a pupil plane closer to the object than said reflecting surface, said low-pass member cutting off a high-frequency component concerning the object image in a bundle of light rays led to said electronic image pickup device.

2. An image-forming optical apparatus according to claim 1, wherein said objective optical system has a prism member formed from a medium having a refractive index (n) larger than 1 (n>1), and wherein said prism member has at least three optical surfaces including:

a first surface disposed closest to the object and having an action through which a bundle of light rays enters said prism member;

a third surface which is a reflecting surface having said rotationally asymmetric surface configuration to reflect the ray bundle entering said prism member; and a second surface having an action through which the ray bundle exits from said prism member.

3. An image-forming optical apparatus according to claim 2, wherein said prism member is formed such that a bundle of light rays from the object enters said prism member through said first surface and is first reflected by said second surface and then reflected by said third surface so as to exit from said prism member through said second surface.

4. An image-forming optical apparatus according to claim 2, wherein said second surface is arranged to reflect the light rays entering through said first surface by total reflection, so that said second surface has both reflecting and transmitting actions.

5. An image-forming optical apparatus according to claim 2, wherein said second surface is a semitransparent reflecting surface provided with a half-mirror coating.

6. An image-forming optical apparatus according to claim 2, wherein said third surface is a reflecting mirror surface provided with a mirror coating.

7. An image-forming optical apparatus according to claim 2, wherein said low-pass member is formed on said first surface of said prism member.

8. An image-forming optical apparatus according to claim 2, wherein said low-pass member is an optical element disposed on an object side of said first surface of said prism member at a distance from said first surface.

9. An image-forming optical apparatus according to claim 7 or 8, wherein at least one surface of said low-pass member has a polyhedral configuration having a spatial frequency low-pass filter function, wherein at least two of lines normal to a plurality of surfaces of said polyhedral configuration at approximately respective centers are in a skew relation with respect to an optical axis, and a boundary line between said plurality of surfaces is decentered with respect to the optical axis of said optical system.

10. An image-forming optical apparatus according to claim 7 or 8, wherein at least one surface of said low-pass member has a polyhedral configuration having a spatial frequency low-pass filter function, wherein at least two of lines normal to a plurality of surfaces of said polyhedral configuration at approximately respective centers are in a skew relation with respect to an optical axis, and a boundary line between said plurality of surfaces and its vicinities are covered with a substance which does not transmit light.

11. An image-forming optical apparatus according to claim 7 or 8, wherein at least one surface of said low-pass member has a polyhedral configuration having a spatial frequency low-pass filter function, wherein at least two of lines normal to a plurality of surfaces of said polyhedral configuration at approximately respective centers are in a skew relation with respect to an optical axis, and an area of a defective surface configuration portion in a vicinity of a boundary line between said plurality of surfaces satisfies the condition (15).

12. An image-forming optical apparatus according to claim 7 or 8, wherein said low-pass member is disposed at a position where the condition (21) is satisfied.

13. An image-forming optical apparatus according to claim 7 or 8, which satisfies the condition (12) and, at the same time, one of the conditions (22) and (23).

14. An image-forming optical apparatus according to claim 8, wherein said low-pass member is an optical element having an ordinary lens surface on one side thereof, said optical element having on the other side thereof at least two slant surfaces split with respect to an optical axis which are in a skew relation to each other.

15. An image-forming optical apparatus according to claim 9, wherein at least one of said plurality of surfaces is one of a spherical surface and an aspherical surface.

16. An electronic camera having the image-forming optical apparatus according to any one of claims 1 to 8 and 14, wherein said image-forming optical apparatus is used as an image pickup system.

17. A video endoscope having the image-forming optical apparatus according to any one of claims 1 to 8 and 14, wherein said image-forming optical apparatus is used as an image pickup system.

* * * * *